US012626854B2

(12) United States Patent
Maki et al.

(10) Patent No.: US 12,626,854 B2
(45) Date of Patent: May 12, 2026

(54) ELECTRONIC COMPONENT AND ELECTRONIC DEVICE

(71) Applicant: Murata Manufacturing Co., Ltd., Kyoto-fu (JP)

(72) Inventors: Yoshifumi Maki, Nagaokakyo (JP); Atsuo Hirukawa, Nagaokakyo (JP); Daisuke Otsuka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 1025 days.

(21) Appl. No.: 17/751,272

(22) Filed: May 23, 2022

(65) Prior Publication Data

US 2022/0384090 A1 Dec. 1, 2022

(30) Foreign Application Priority Data

May 25, 2021 (JP) ................................ 2021-087838

(51) Int. Cl.
*H01F 27/29* (2006.01)
*H01F 17/00* (2006.01)

(52) U.S. Cl.
CPC ....... *H01F 27/292* (2013.01); *H01F 17/0013* (2013.01)

(58) Field of Classification Search
CPC ........................... H01F 27/292; H01F 17/0013
USPC .......................................................... 336/200
See application file for complete search history.

(56) References Cited

U.S. PATENT DOCUMENTS

| | | | | |
|---|---|---|---|---|
| 10,361,035 | B1 * | 7/2019 | Song | H01G 4/224 |
| 10,405,435 | B2 * | 9/2019 | Wakashima | H01G 4/40 |
| 10,796,837 | B2 * | 10/2020 | Ito | H01F 27/29 |
| 11,227,715 | B2 * | 1/2022 | Hamada | H01F 17/0013 |
| 11,557,436 | B2 * | 1/2023 | Fukutomi | H01G 4/232 |
| 2020/0111608 | A1 * | 4/2020 | Sato | H01F 41/046 |
| 2021/0134529 | A1 * | 5/2021 | Fukutomi | H01G 4/012 |
| 2021/0175017 | A1 * | 6/2021 | Kobayashi | H01G 4/2325 |

(Continued)

FOREIGN PATENT DOCUMENTS

| | | | | |
|---|---|---|---|---|
| JP | 2019-186255 | A | | 10/2019 |
| JP | 2020141059 | A | * | 9/2020 |
| JP | 2023103954 | A | * | 7/2023 |

(Continued)

*Primary Examiner* — Shawki S Ismail
*Assistant Examiner* — Joselito S. Baisa
(74) *Attorney, Agent, or Firm* — Studebaker Brackett PLLC

(57) ABSTRACT

An electronic component includes a body, an inner conductor inside the body, and an outer electrode that lies on part of at least a first main surface of the body and includes an underlying electrode and a plating electrode with which the underlying electrode is covered. The underlying electrode includes a first underlying electrode on part of the first main surface and connected directly to the inner conductor and a second underlying electrode at part of the first main surface away from the first underlying electrode and closer than the first underlying electrode to the center of the body in the length direction and not connected directly to the inner conductor. The plating electrode includes first and second plating electrodes. The first underlying electrode is covered with the first plating electrode, and the second underlying electrode is covered with the second plating electrode.

20 Claims, 8 Drawing Sheets

(56) References Cited

U.S. PATENT DOCUMENTS

2021/0375550 A1* 12/2021 Yatagawa .............. H01G 4/248

FOREIGN PATENT DOCUMENTS

KR 20170110467 A * 10/2017 ............... H01G 4/30
WO 2015/146814 A1 10/2015

* cited by examiner

ELECTRONIC COMPONENT AND ELECTRONIC DEVICE

CROSS-REFERENCE TO RELATED APPLICATION

This application claims benefit of priority to Japanese Patent Application No. 2021-087838, filed May 25, 2021, the entire content of which is incorporated herein by reference.

BACKGROUND

Technical Field

The present disclosure relates to an electronic component and an electronic device.

Background Art

An electronic component or, more specifically, a multilayer coil component including outer electrodes is disclosed in Japanese Unexamined Patent Application Publication No. 2019-186255. The outer electrodes of the multilayer coil component disclosed in Japanese Unexamined Patent Application Publication No. 2019-186255 are each obtained by application of plating to an underlying electrode.

Electronic components such as the multilayer coil component that includes an outer electrode as disclosed in Japanese Unexamined Patent Application Publication No. 2019-186255 may be soldered onto substrates, in which case tensile stress caused by thermal contraction of the solder can be exerted on the outer electrode. Due to the tensile stress, plating (a plating electrode) serving as the outer electrode would come off, and as a result, the reliability of the electronic component would be impaired.

SUMMARY

The present disclosure therefore provides an electronic component designed such that an outer electrode of the electronic component is less likely to come off when the electronic component is soldered onto a substrate. The present disclosure also provides an electronic device including the electronic component.

An electronic component according to the present disclosure includes a body, an inner conductor, and an outer electrode. The body has a first end surface, a second end surface, a first main surface, a second main surface, a first side surface, and a second side surface. The first and second end surfaces are located on opposite sides in a length direction. The first and second main surfaces are located on opposite sides in a height direction orthogonal to the length direction. The first and second side surfaces are located on opposite sides in a width direction orthogonal to the length direction and orthogonal to the height direction. The inner conductor is located inside the body. The outer electrode lies on part of at least the first main surface of the body. The outer electrode includes an underlying electrode and a plating electrode with which the underlying electrode is covered. The underlying electrode includes a first underlying electrode and a second underlying electrode. The first underlying electrode lies on part of the first main surface of the body and is connected directly to the inner conductor. The second underlying electrode is provided to part of the first main surface of the body in a manner so as to be discretely located away from the first underlying electrode and closer than the first underlying electrode to the center of the body in the length direction and is not connected directly to the inner conductor. The plating electrode includes a first plating electrode and a second plating electrode. The first underlying electrode is covered with the first plating electrode. The second underlying electrode is covered with the second plating electrode.

An electronic device according to the present disclosure includes the electronic component according to the present disclosure, a substrate, and solder. The substrate is provided with a land electrode disposed on a surface of the substrate. The solder forms an electrical connection between the outer electrode of the electronic component and the land electrode on the substrate. The first plating electrode and the second plating electrode are covered with the solder, with no gap between one part and another part of the solder extending over the first and second plating electrodes.

The electronic component provided by the present disclosure is designed such that the outer electrode of the electronic component is less likely to come off when the electronic component is soldered onto the substrate. The electronic device provided by the present disclosure is designed to include the electronic component.

DETAILED DESCRIPTION

The following describes an electronic component according to the present disclosure and an electronic device according to the present disclosure. The following should not be construed as limiting the configuration of the present disclosure, which may be modified as appropriate within a range not departing from the gist of the present disclosure. It should be noted that varying combinations of two or more desired features, which will be described below, are also embraced by the present disclosure.

The embodiments described herein are merely examples. Needless to say, partial replacements or combinations of features illustrated in different embodiments are possible. Redundant description of features common to Embodiment 1 and another embodiment will be omitted, and Embodiment 2 and subsequent examples will be described with a focus on their distinctive features. This is particularly true for actions and effects; that is, not every embodiment refers to actions and effects caused by similar features. The expressions "electronic component according to the present disclosure" and "electronic device according to the present disclosure" are used in the following description when there is no need to distinguish one embodiment from another.

Embodiment 1

The electronic component according to the present disclosure includes a body, an inner conductor, and an outer electrode. The body has a first end surface, a second end surface, a first main surface, a second main surface, a first side surface, a second side surface. The first and second end surfaces are located on opposite sides in a length direction. The first and second main surfaces are located on opposite sides in a height direction orthogonal to the length direction. The first and second side surfaces are located on opposite sides in a width direction orthogonal to the length direction and orthogonal to the height direction. The inner conductor is located inside the body. The outer electrode lies on part of at least the first main surface of the body.

The inner conductor of the electronic component according to the present disclosure may include a coil conductor. In this case, the electronic component according to the present disclosure is regarded as a coil component. The outer electrode of the electronic component according to the present disclosure may include a first outer electrode and a second outer electrode. As the electronic component according to Embodiment 1 of the present disclosure, a coil component including the first outer electrode and the second outer will be described below.

Figure 1:
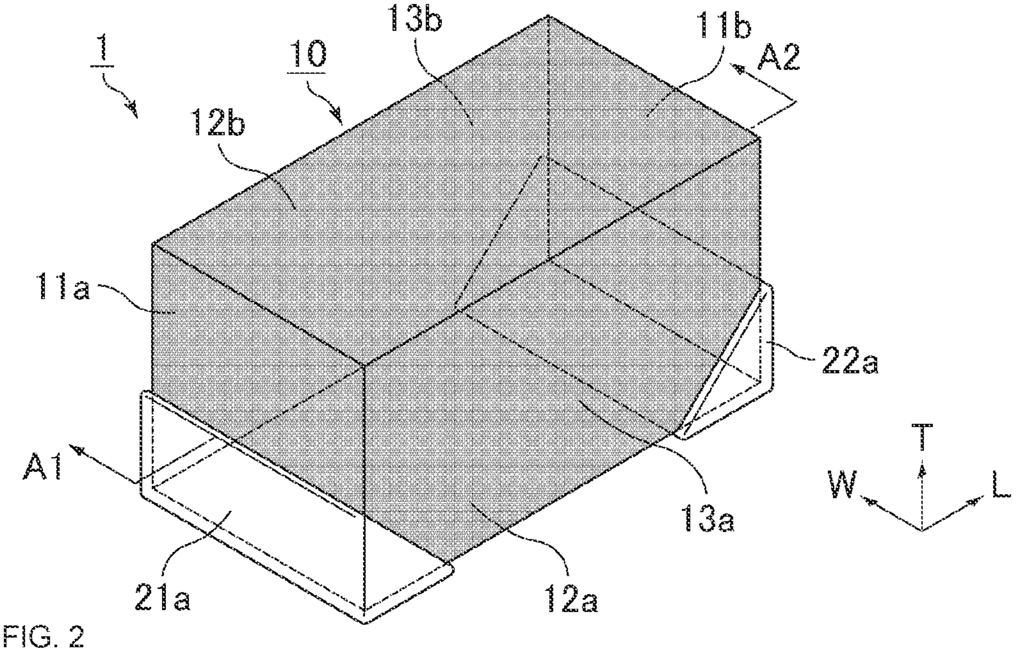
FIG. 1 is a schematic perspective view of an electronic component according to Embodiment 1 of the present disclosure.

FIG. 1 is a schematic perspective view of the electronic component according to Embodiment 1 of the present disclosure.

Referring to FIG. 1, a coil component 1 includes a body 10, a first outer electrode 21*a*, and a second outer electrode 22*a*. The coil component 1 also includes coil conductors, which are not illustrated in FIG. 1. The coil conductors constitute the inner conductor located inside the body 10 and will be described later.

The term "length direction", "height direction", and "width direction" herein refer to the directions respectively denoted by L, T, and W in, for example, FIG. 1. The length direction L, the height direction T, and the width direction W are orthogonal to each other.

The body 10 has a first end surface 11*a* and a second end surface 11*b*, a first main surface 12*a* and a second main surface 12*b*, a first side surface 13*a*, and a second side surface 13*b*. The first end surface 11*a* and the second end surface 11*b* are located on opposite sides in the length direction L. The first main surface 12*a* and the second main surface 12*b* are located on opposite sides in the height direction T. The first side surface 13*a* and the second side surface 13*b* are located on opposite sides in the width direction W. The body 10 is a rectangular parallelepiped or is substantially in the form of a rectangular parallelepiped.

It is not required that the first end surface 11*a* and the second end surface 11*b* of the body 10 be precisely orthogonal to the length direction L. It is also not required that the first main surface 12*a* and the second main surface 12*b* of the body 10 be precisely orthogonal to the height direction T. Likewise, it is not required that the first side surface 13*a* and the second side surface 13*b* of the body 10 be precisely orthogonal to the width direction W.

The first main surface 12*a* of the body 10 is a mounting surface facing a substrate on which the coil component 1 is mounted.

Corners and ridges of the body 10 are preferably rounded. Each corner of the body 10 is a place where three surfaces of the body 10 meet. Each ridge of the body 10 is a place where two surfaces of the body 10 meet.

The first outer electrode 21*a* lies on part of at least the first main surface 12*a* of the body 10. In the example illustrated in FIG. 1, the first outer electrode 21*a* lies on part of the first main surface 12*a* of the body 10 and extends continuously over part of the first end surface 11*a*, part of the first side surface 13*a*, and part of the second side surface 13*b*. The first outer electrode 21*a* lying on part of the mounting surface or, more specifically, on part of the first main surface 12*a* of the body 10 provides greater ease of mounting the coil component 1 onto a substrate.

The second outer electrode 22*a* lies on part of at least the first main surface 12*a* of the body 10 and is discretely located away from the first outer electrode 21*a*. In the example illustrated in FIG. 1, the second outer electrode 22*a* lying on part of the first main surface 12*a* of the body 10 extends over part of the second end surface 11*b*, part of the first side surface 13*a*, and part of the second side surface 13*b*. The second outer electrode 22*a* lying on part of the mounting surface or, more specifically, on part of the first main surface 12*a* of the body 10 provides greater ease of mounting the coil component 1 onto a substrate.

Figure 2:
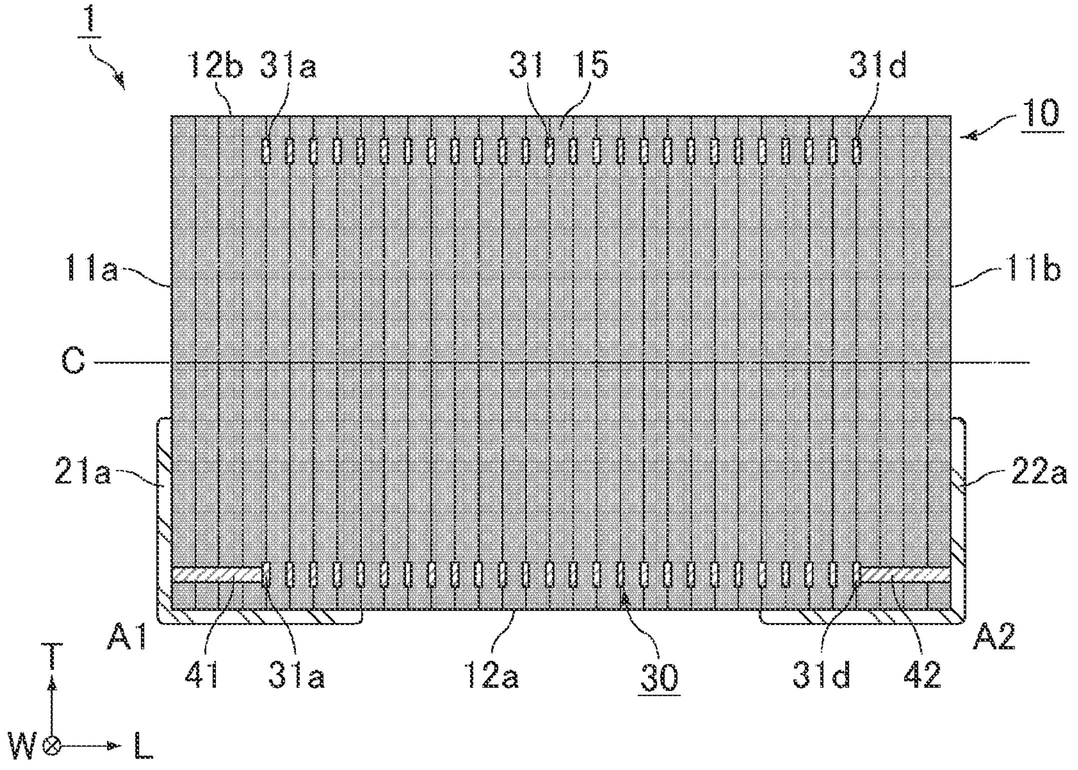
FIG. 2 is a schematic sectional view of an example of a portion of the electronic component taken along line A1-A2 in FIG. 1.

FIG. 2 is a schematic sectional view of an example of a portion of the electronic component taken along line A1-A2 in FIG. 1.

As illustrated in FIG. 2, the body 10 includes insulating layers 15, which are arranged in a stacking direction. More specifically, the insulating layers are stacked in the length direction L. That is, the stacking direction of the insulating layers 15 coincides with the length direction L and is parallel to the mounting surface, that is, to the first main surface 12*a* of the body 10. Boundaries between the insulating layers 15 are illustrated for convenience; however, these boundaries in actuality are not as clear as in FIG. 2.

A coil 30 is located inside the body 10. The coil 30 includes coil conductors 31, which are electrically connected to each other to constitute the inner conductor. For example, the coil 30 is in the form of a solenoid. The coil conductors 31 are stacked together with the insulating layers 15 in the length direction L. The coil component 1, in which the coil conductors 31 constituting the coil 30 are stacked together with the insulating layers 15, is also referred to as a multilayer coil component.

FIG. 2 is not an accurate illustration in terms of, for example, the shape of the coil 30, the position of the coil conductors 31, and the connection between coil conductors 31. For example, adjacent ones of the coil conductors 31 disposed side by side in the length direction L are electrically connected to each other by via conductors (not illustrated in FIG. 2).

The coil 30 has a coil axis C. The coil axis C of the coil 30 extends in the length direction L and extends between the first end surface 11*a* and the second end surface 11*b* of the body 10. That is, the coil axis C of the coil 30 extends parallel to the mounting surface, that is, to the first main surface 12*a* of the body 10. The coil axis C of the coil 30 passes through the center of the shape of the coil 30 viewed in the length direction L.

Thus, both the stacking direction of the insulating layers 15 and the direction of the coil axis C of the coil 30 are parallel to the mounting surface, that is, to the first main surface 12*a* of the body 10.

As the inner conductor, a first connecting conductor 41 and a second connecting conductor 42 may also be included in the coil component 1.

The first connecting conductor 41 includes via conductors (not illustrated in FIG. 2) that are electrically connected to each other and are stacked together with the insulating layers 15 in the length direction L. The first connecting conductor 41 is exposed at the first end surface 11*a* of the body 10.

At least part of the first outer electrode 21*a* is electrically connected to the coil 30 with the first connecting conductor 41 therebetween. The coil conductor 31 closer than the other coil conductors 31 to the first end surface 11*a* of the body 10 is provided with a coil conductor 31*a*. That is, at least part of the first outer electrode 21*a* is electrically connected to the coil conductor 31*a* with the first connecting conductor 41 therebetween.

The first connecting conductor 41 forms a connection between at least part of the first outer electrode 21*a* and the coil 30. The first connecting conductor 41 preferably forms a linear connection between the first outer electrode 21*a* and the coil 30 or, more specifically, between the first outer electrode 21*a* and the coil conductor 31*a*. The first connecting conductor 41 preferably overlaps the coil conductor 31*a* when viewed in the length direction L. The first connecting conductor 41 is preferably closer than the coil axis C to the mounting surface, that is, to the first main surface 12*a* of the body 10. This layout provides ease of forming an electrical connection between the first outer electrode 21*a* and the coil 30.

The linear connection between the first outer electrode 21*a* and the coil 30 may be formed by the first connecting conductor 41 in such a manner that the via conductors constituting the first connecting conductor 41 overlap each other when viewed in the length direction L. Thus, it is not required that the via conductors constituting the first connecting conductor 41 be arranged in a precisely straight line.

The connection between the first connecting conductor 41 and the coil conductor 31*a* is preferably closer than any other part of the coil conductor 31*a* to the first main surface 12*a* of the body 10. This layout enables a reduction in the area of the first outer electrode 21*a* on the first end surface 11*a* of the body 10. This leads to a reduction in stray capacitance between the first outer electrode 21*a* and the coil 30, and the radio-frequency characteristics of the coil component 1 are improved correspondingly.

The coil component 1 may include one first connecting conductor 41 only or may include two or more first connecting conductors 41.

The second connecting conductor 42 includes via conductors (not illustrated in FIG. 2) that are electrically connected to each other and are stacked together with the insulating layers 15 in the length direction L. The second connecting conductor 42 is exposed at the second end surface 11*b* of the body 10.

At least part of the second outer electrode 22*a* is electrically connected to the coil 30 with the second connecting conductor 42 therebetween. The coil conductor 31 closer than the other coil conductors 31 to the second end surface 11*b* of the body 10 is provided with a coil conductor 31*d*. That is, at least part of the second outer electrode 22*a* is electrically connected to the coil conductor 31*d* with the second connecting conductor 42 therebetween.

The second connecting conductor 42 forms a connection between at least part of the second outer electrode 22*a* and the coil 30. The second connecting conductor 42 preferably forms a linear connection between the second outer electrode 22*a* and the coil 30 or, more specifically, between the second outer electrode 22*a* and the coil conductor 31*d*. The second connecting conductor 42 preferably overlaps the coil conductor 31*d* when viewed in the length direction L. The second connecting conductor 42 is preferably closer than the coil axis C to the mounting surface, that is, to the first main surface 12*a* of the body 10. This layout provides ease of forming an electrical connection between the second outer electrode 22*a* and the coil 30.

The linear connection between the second outer electrode 22*a* and the coil 30 may be formed by the second connecting conductor 42 in such a manner that the via conductors constituting the second connecting conductor 42 overlap each other when viewed in the length direction L. Thus, it is not required that the via conductors constituting the second connecting conductor 42 be arranged in a precisely straight line.

The connection between the second connecting conductor 42 and the coil conductor 31*d* is preferably closer than any other part of the coil conductor 31*d* to the first main surface 12*a* of the body 10. This layout enables a reduction in the area of the second outer electrode 22*a* on the second end surface 11*b* of the body 10. This leads to a reduction in stray capacitance between the second outer electrode 22*a* and the coil 30, and the radio-frequency characteristics of the coil component 1 are improved correspondingly.

The coil component 1 may include one second connecting conductor 42 only or may include two or more second connecting conductors 42.

Figure 3:
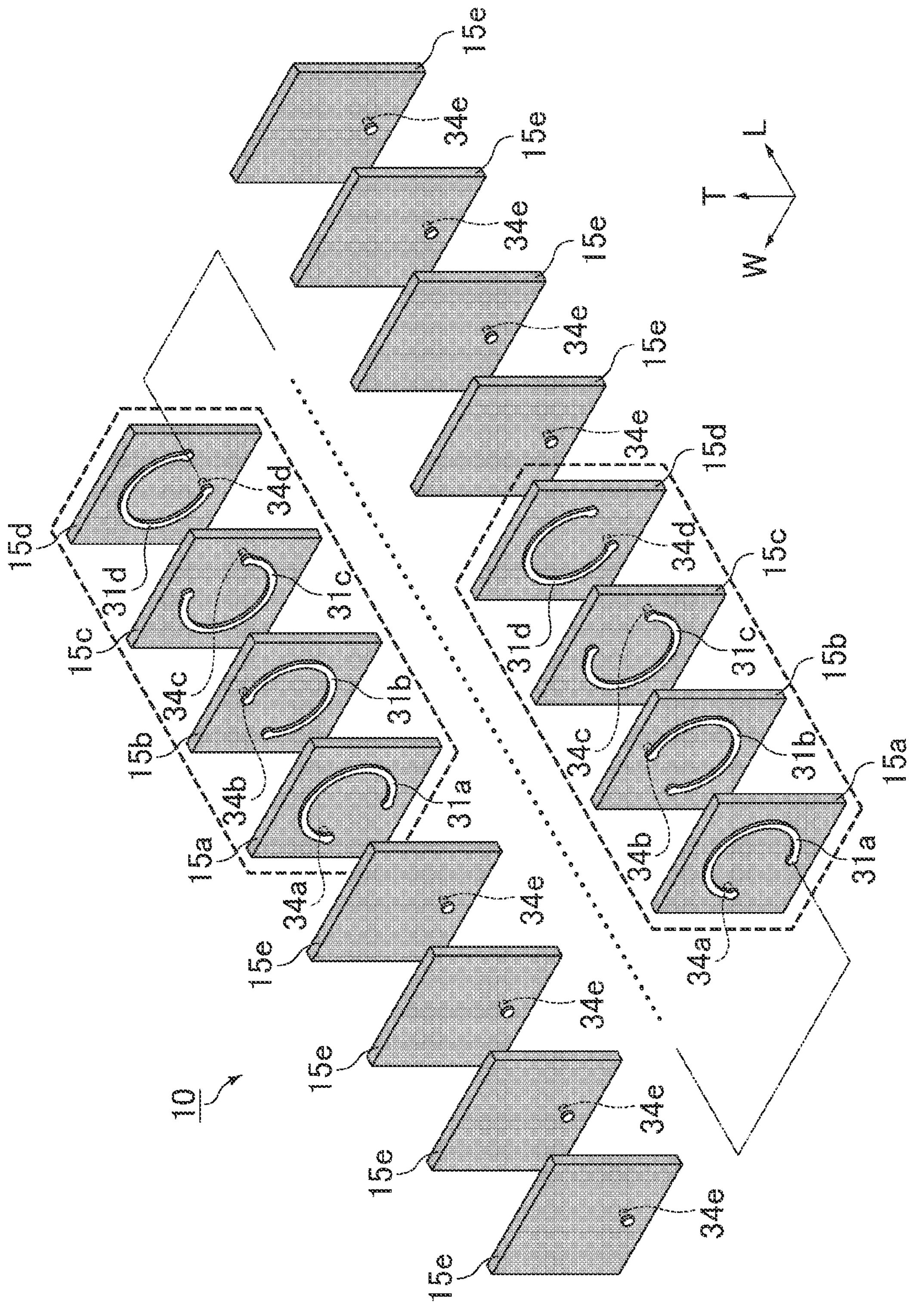
FIG. 3 is a schematic perspective view of a body and a coil in FIG. 2, illustrating an example of a state in which the body and the coil are disassembled.
Figure 4:
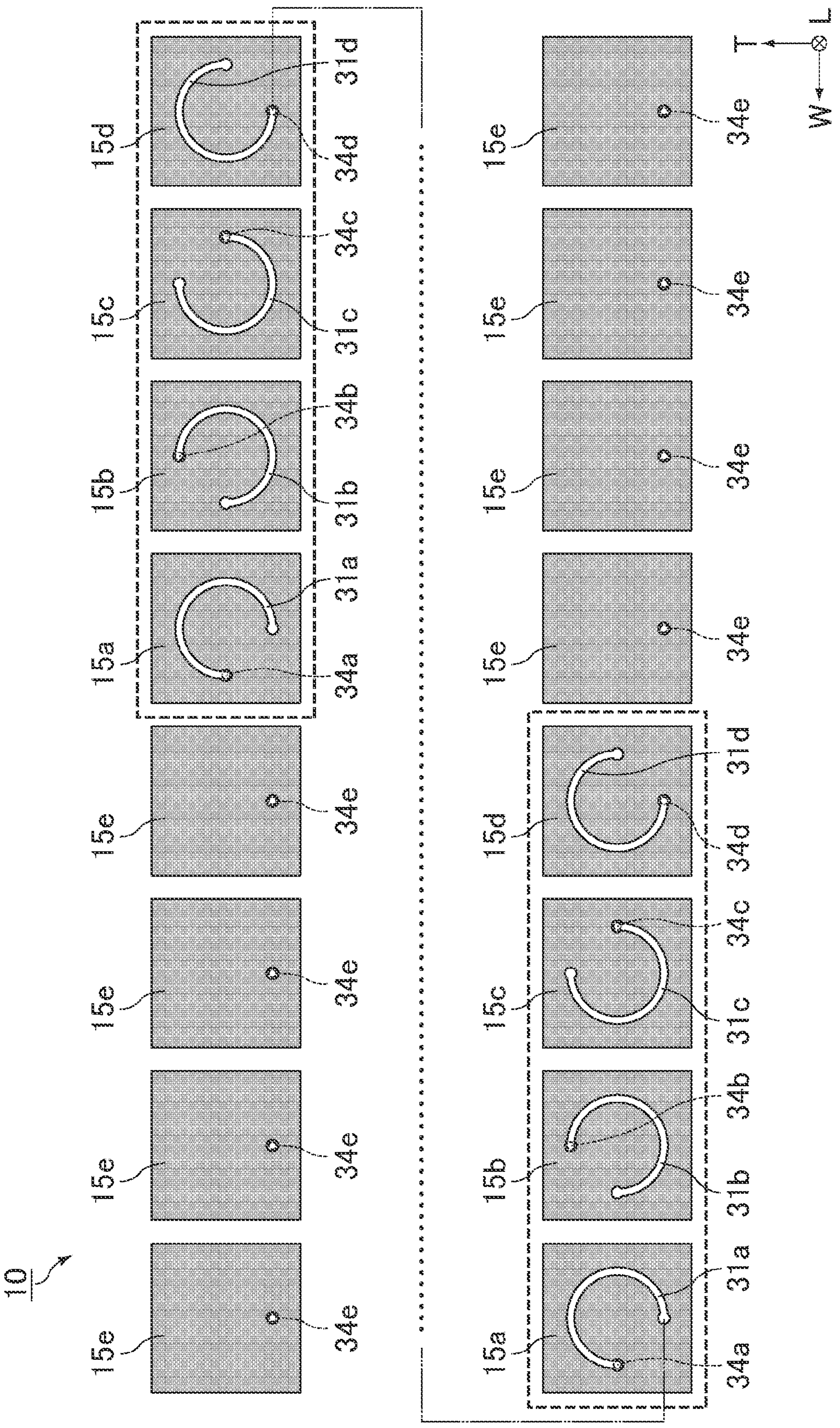
FIG. 4 is a schematic plan view of the body and the coil in FIG. 2, illustrating an example of a state in which the body and the coil are disassembled.

FIG. 3 is a schematic perspective view of the body and the coil in FIG. 2, illustrating an example of a state in which the body and the coil are disassembled. FIG. 4 is a schematic plan view of the body and the coil in FIG. 2, illustrating an example of a state in which the body and the coil are disassembled.

In the example illustrated in FIGS. 3 and 4, insulating layers 15*a*, insulating layers 15*b*, insulating layers 15*c*, insulating layers 15*d*, and insulating layers 15*e* are included as the insulating layers 15 of the body 10 and are arranged in the stacking direction. More specifically, these insulating layers are stacked in the length direction L.

The insulating layers 15*a*, the insulating layers 15*b*, the insulating layers 15*c*, the insulating layers 15*d*, and the insulating layers 15*e* are herein referred to as the insulating layers 15 when there is no need to distinguish one from another.

The insulating layers 15*a*, the insulating layers 15*b*, the insulating layers 15*c*, and the insulating layers 15*d* are provided with the respective coil conductors 31 or, more specifically, coil conductors 31*a*, coil conductors 31*b*, coil conductors 31*c*, and coil conductors 31*d*, each of which is disposed on a main surface of the corresponding one of the insulating layers. The coil conductors 31*a*, the coil conductors 31*b*, the coil conductors 31*c*, and the coil conductors 31*d* are stacked in the length direction L together with the insulating layers 15*a*, the insulating layers 15*b*, the insulating layers 15*c*, and the insulating layers 15*d* and are electrically connected to each other.

The coil conductors 31*a*, the coil conductors 31*b*, the coil conductors 31*c*, and the coil conductors 31*d* are herein referred to as the coil conductors 31 when there is no need to distinguish one from another.

In the example illustrated in FIGS. 3 and 4, the length of each of the coil conductors 31*a*, the coil conductors 31*b*, the coil conductors 31*c*, and the coil conductors 31*d* is three-fourths of each turn of the coil 30. This means that four coil conductors are required to form three winding turns of the coil 30. The coil conductors 31*a*, the coil conductors 31*b*, the coil conductors 31*c*, and the coil conductors 31*d* are stacked in a repetitive pattern in the body 10, with each unit (equivalent to three winding turns) composed of one coil conductor 31*a*, one coil conductor 31*b*, one coil conductor 31*c*, and one coil conductor 31*d*.

Both ends of each coil conductor 31 may include land portions. More specifically, the land portions are included in the coil conductors 31*a*, the coil conductors 31*b*, the coil conductors 31*c*, and the coil conductors 31*d* in such a manner that both ends of each coil conductor are provided with the respective land portions.

The land portions of the coil conductors 31 may be circular or polygonal when viewed in the length direction L.

The insulating layers 15*a*, the insulating layers 15*b*, the insulating layers 15*c*, and the insulating layers 15*d* are provided with via conductors 34*a*, via conductors 34*b*, via conductors 34*c*, and via conductors 34*d*, each of which extends through the corresponding one of the insulating layers in the length direction L.

The via conductors 34*a*, the via conductors 34*b*, the via conductors 34*c*, and the via conductors 34*d* are connected to the coil conductors 31*a*, the coil conductors 31*b*, the coil conductors 31*c*, and the coil conductors 31*d* in such a manner that each of the via conductors is connected to one end of the corresponding one of the coil conductors. As mentioned above, land portions may be included in the coil conductors 31*a*, the coil conductors 31*b*, the coil conductors 31*c*, and the coil conductors 31*d* in such a manner that both ends of each coil conductor are provided with the respective land portions. In this case, the via conductors 34*a*, the via conductors 34*b*, the via conductors 34*c*, and the via conductors 34*d* are connected to the land portions of the coil conductors 31*a*, the land portions of the coil conductors 31*b*, the land portions of the coil conductors 31*c*, and the land portions of the coil conductors 31*d*.

The multilayer structure includes layers stacked in a repetitive pattern, with each unit (corresponding to the portion surrounded by a dotted line in FIGS. 3 and 4) being composed of one insulating layer 15*a* provided with the corresponding coil conductor 31*a* and the corresponding via conductor 34*a*, one insulating layer 15*b* provided with the corresponding coil conductor 31*b* and the corresponding via conductor 34*b*, one insulating layer 15*c* provided with the corresponding coil conductor 31*c* and the corresponding via conductor 34*c*, and one insulating layer 15*d* provided with the corresponding coil conductor 31*d* and the corresponding via conductor 34*d*. The electrical connection between the coil conductor 31*a*, the coil conductor 31*b*, the coil conductor 31*c*, and the coil conductor 31*d* in each unit are formed by the via conductor 34*a*, the via conductor 34*b*, the via conductor 34*c*, and the via conductor 34*d*. That is, adjacent ones of the coil conductors disposed side by side in the length direction L are electrically connected to each other by the respective via conductors.

The coil 30 structured as above is in the form of a solenoid and is located inside the body 10.

The coil 30 may be circular or polygonal when viewed in the length direction L. The coil 30 may include land portions or, more specifically, both ends of each coil conductor 31 may include land portions, in which case the land portions are left out of consideration in terms of the shape of the coil 30.

The insulating layers 15*e* are provided with via conductors 34*e*, each of which extends through the corresponding one of the insulating layers 15*e* in the length direction L.

Land portions connected to the via conductors 34*e* may be provided on main surfaces of the insulating layers 15*e*.

Some of the insulating layers 15*e* provided with the via conductors 34*e* are arranged in a stack on the insulating layer 15*a* that is located at one end of the coil 30 and is provided with the coil conductor 31*a* and the via conductor 34*a*. Thus, the via conductors 34*e* are electrically connected to each other to constitute the first connecting conductor 41, and the first connecting conductor 41 is exposed at the first end surface 11*a* of the body 10. The first connecting conductor 41 forms an electrical connection between at least part of the first outer electrode 21*a* and the coil conductor 31*a* accordingly.

The other insulating layers 15*e* provided with the via conductors 34*e* are arranged in a stack on the insulating layer 15*d* that is located at the other end of the coil 30 and is provided with the coil conductor 31*d* and the via conductor 34*d*. Thus, the via conductors 34*e* are electrically connected to each other to constitute the second connecting conductor 42, and the second connecting conductor 42 is exposed at the second end surface 11*b* of the body 10. The second connecting conductor 42 forms an electrical connection between at least part of the second outer electrode 22*a* and the coil conductor 31*d* accordingly.

The coil conductors 31*a*, the coil conductors 31*b*, the coil conductors 31*c*, the coil conductors 31*d*, the via conductors 34*a*, the via conductors 34*b*, the via conductors 34*c*, the via conductors 34*d*, and the via conductors 34*e* may be made of Ag, Au, Cu, Pd, Ni, Al, or an alloy containing at least one of these metals.

As the electronic device according to the present disclosure, an example in which an electronic device according to the present disclosure is soldered onto a substrate will be described below with a focus on the structure of the outer electrode of the electronic component according to the present disclosure and on actions and effects of the outer electrode.

The electronic device according to the present embodiment includes the electronic component according to the present disclosure, a substrate, and solder. The substrate is provided with a land electrode disposed on a surface of the substrate. The solder forms an electrical connection between the outer electrode of the electronic component and the land electrode on the substrate. The electronic device according to the present disclosure may be configured as follows: the outer electrode includes a first outer electrode and a second outer electrode; the land electrode includes a first land electrode and a second land electrode; and the solder includes a first solder joint forming an electrical connection between the first outer electrode and the first land electrode and a second solder joint forming an electrical connection between the second outer electrode and the second land electrode.

As mentioned above, the electronic component according to Embodiment 1 of the present disclosure is a coil component including the first outer electrode and the second outer electrode. The following describes the electronic device according to Embodiment 1 of the present disclosure, in which the coil component that is the electronic component according to Embodiment 1 of the present disclosure is mounted on the first land electrode and the second land electrode on the substrate with the first solder joint and the second solder joint.

Figure 5:
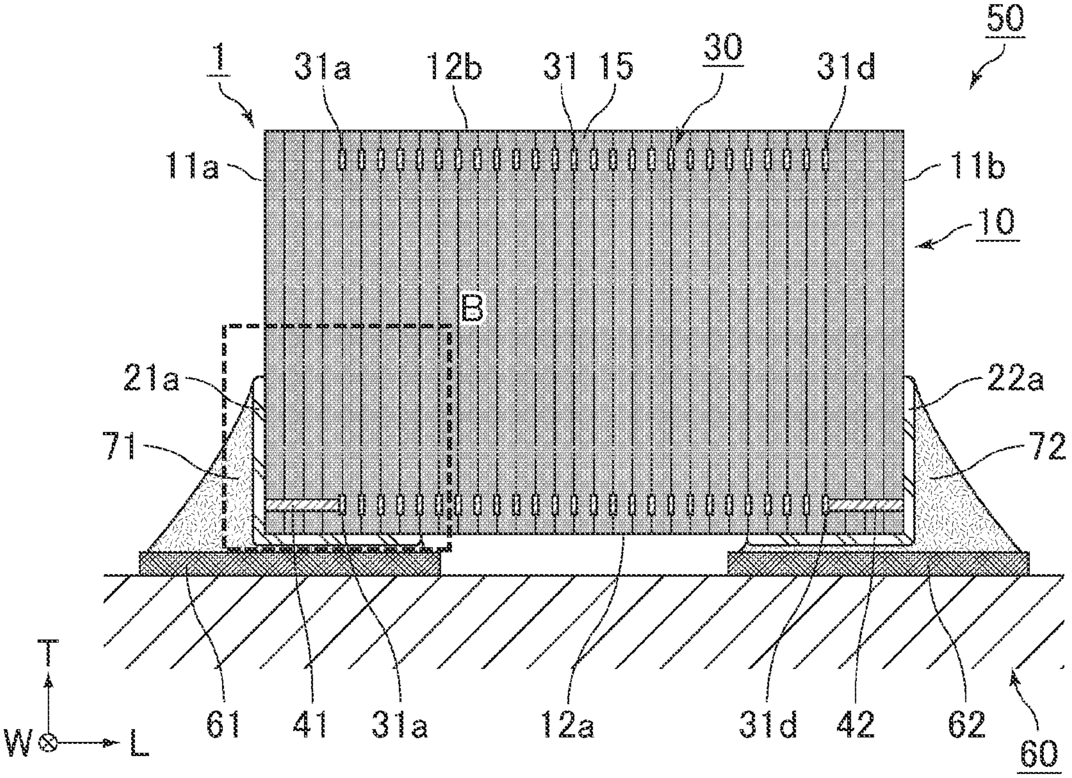
FIG. 5 is a schematic sectional view of an electronic device according to Embodiment 1 of the present disclosure.

FIG. 5 is a schematic sectional view of the electronic device according to Embodiment 1 of the present disclosure.

Referring to FIG. 5, an electronic device 50 includes the coil component 1, a substrate 60, a first solder joint 71 and a second solder joint 72.

The substrate 60 is provided with a first land electrode 61 and a second land electrode 62, which are disposed on a surface of the substrate 60. The first land electrode 61 and the second land electrode 62 are discretely located away from each other.

The first solder joint 71 forms an electrical connection between the first outer electrode 21*a* of the coil component 1 and the first land electrode 61 on the substrate 60.

The second solder joint 72 forms an electrical connection between the second outer electrode 22*a* of the coil component 1 and the second land electrode 62 on the substrate 60.

The structure of the first outer electrode 21*a* and the structure of the second outer electrode 22*a* are not accurately illustrated in FIG. 5 and will be described below in detail.

The outer electrode of the electronic component according to the present disclosure includes an underlying electrode and a plating electrode with which the underlying electrode is covered. The underlying electrode includes a first underlying electrode and a second underlying electrode. The first underlying electrode lies on part of the first main surface of the body and is connected directly to the inner conductor. The second underlying electrode is provided to part of the first main surface of the body in a manner so as to be discretely located away from the first underlying electrode and closer than the first underlying electrode to the center of the body in the length direction and is not connected directly to the inner conductor. The plating electrode includes a first plating electrode and a second plating electrode. The first underlying electrode is covered with the first plating electrode, and the second underlying electrode is covered with the second plating electrode.

Figure 6:
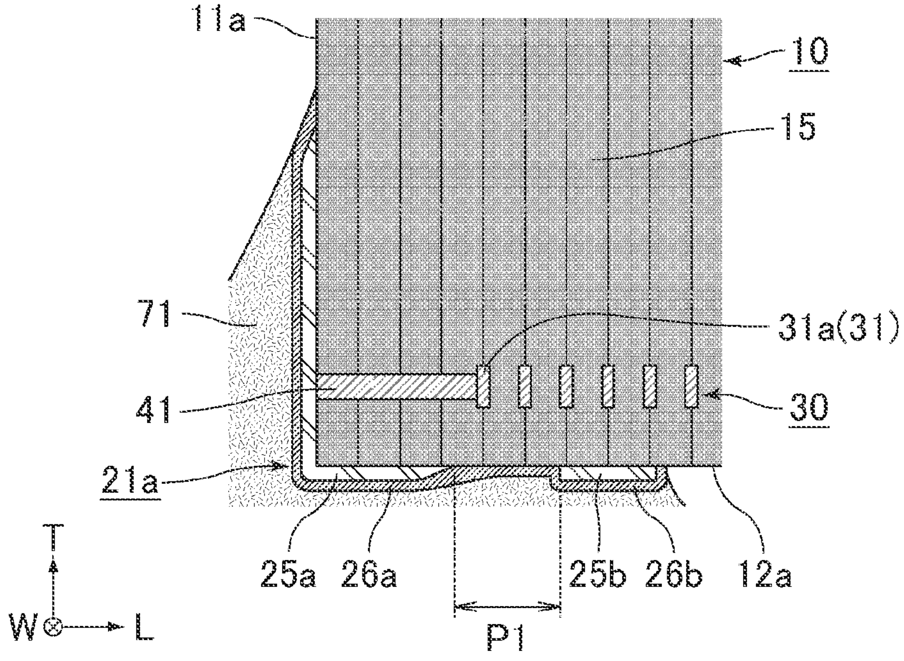
FIG. 6 is an enlarged sectional view of a region B in FIG. 5, schematically illustrating a first example.

FIG. 6 is an enlarged sectional view of a region B in FIG. 5, schematically illustrating a first example.

In the example illustrated in FIG. 6, the first outer electrode 21*a* includes a first underlying electrode 25*a*, a second underlying electrode 25*b*, a first plating electrode 26*a*, and a second plating electrode 26*b*.

The first underlying electrode 25*a* lies on part of the first main surface 12*a* of the body 10. The first underlying electrode 25*a* lying on part of the first main surface 12*a* of the body 10 extends continuously over part of the first end surface 11*a*. The first underlying electrode 25*a* also extends over part of the first side surface 13*a* of the body 10 and part of the second side surface 13*b* of the body 10 (not illustrated in FIG. 6).

The first underlying electrode 25*a* is connected directly to the inner conductor or, more specifically, to the first connecting conductor 41 exposed at the first end surface 11*a* of the body 10.

In an example different from the one illustrated in FIG. 6, the first connecting conductor 41 is eliminated such that one of the coil conductors 31 is exposed at the first end surface 11*a* of the body 10, in which case the first underlying electrode 25*a* is connected directly to the coil conductor 31*a*.

The second underlying electrode 25*b* is provided to part of the first main surface 12*a* of the body 10 in a manner so as to be discretely located away from the first underlying electrode 25*a* and closer than the first underlying electrode 25*a* to the center of the body 10 in the length direction L. More specifically, the second underlying electrode 25*b* lies on part of the first main surface 12*a* of the body 10 in a manner so as to be discretely located away from the first underlying electrode 25*a* and closer than the first underlying electrode 25*a* to the center of the body 10 in the length direction L.

The second underlying electrode 25*b* is not connected directly to the inner conductor or, more specifically, to the coil conductors 31, the first connecting conductor 41, and the second connecting conductor 42.

P1 denotes the distance between the first underlying electrode 25*a* and the second underlying electrode 25*b* in the length direction L. The distance P1 is preferably greater than or equal to 6 μm and less than or equal to 66 μm (i.e., from 6 μm to 66 μm) and is more preferably greater than or equal to 36 μm and less than or equal to 66 μm (i.e., from 36 μm to 66 μm).

The distance between the first underlying electrode and the second underlying electrode in the length direction is herein defined as the shortest distance between them in a cross section in a plane located substantially in the middle of the electronic component (the coil component) in the width direction and extending in the length direction and the height direction.

The first underlying electrode 25*a* and the second underlying electrode 25*b* each preferably contain Ag or Cu and more preferably contain Ag.

The first underlying electrode 25*a* is covered with the first plating electrode 26*a*. More specifically, the first plating electrode 26*a* is in contact with the first underlying electrode 25*a* and the first main surface 12*a* of the body 10 when a cross section in a plane extending in the length direction L and the height direction T is viewed. In the example illustrated in FIG. 6, the first underlying electrode 25*a* extends over part of the first end surface 11*a* of the body 10 such that the first plating electrode 26*a* is also in contact with the first end surface 11*a* of the body 10. The first underlying electrode 25*a* also extends over part of the first side surface 13*a* of the body 10 and part of the second side surface 13*b* of the body 10 such that the first plating electrodes 26*a* is also in contact with the first side surface 13*a* and the second side surface 13*b* (not illustrated in FIG. 6) of the body 10.

The second underlying electrode 25*b* is covered with the second plating electrode 26*b*. More specifically, the second plating electrode 26*b* is in contact with the second underlying electrode 25*b* and the first main surface 12*a* of the body 10 when a cross section in a plane extending in the length direction L and the height direction T is viewed.

The first plating electrode 26*a* and the second plating electrode 26*b* each preferably contain Ni and/or Sn.

The first plating electrode 26*a* and the second plating electrode 26*b* each may be a monolayer structure or a multilayer structure and are each preferably a multiplayer structure. In the case where the first plating electrode 26*a* is a multilayer structure, the first plating electrode 26*a* preferably includes an Ni-plating electrode on the first underlying electrode 25*a* and an Sn-plating electrode on the Ni-plating electrode. In the case where the second plating electrode 26*b* is a multilayer structure, the second plating electrode 26*b* preferably includes an Ni-plating electrode on the second underlying electrode 25*b* and an Sn-plating electrode on the Ni-plating electrode.

Plating electrodes, such as the first plating electrode 26*a* and the second plating electrode 26*b*, are distinguishable from underlying electrodes in any form other than the plating or, more specifically, from the first underlying electrode 25*a* and the second underlying electrode 25*b* on the basis of, for example, the elemental composition identified by energy dispersive x-ray analysis (EDX) or the presence of tightly packed arrangement in a cross section in a plane extending in the length direction and the height direction.

The electronic device according to the present disclosure is designed such that the first plating electrode and the second plating electrode are covered with solder, with no gap between one part and another part of the solder extending over the first and second plating electrodes.

The first plating electrode 26*a* and the second plating electrode 26*b* in the example illustrated in FIG. 6 are covered with the first solder joint 71, with no gap between one part and another part of the first solder joint 71 extending over the first plating electrode 26*a* and the second plating electrode 26*b*. More specifically, the first solder joint 71 is in contact with the first plating electrode 26*a* and the second plating electrode 26*b* when a cross section in a plane extending in the length direction L and the height direction T is viewed.

As illustrated in FIGS. 5 and 6, the first outer electrode 21*a* of the coil component 1 includes the second underlying electrode 25*b* in addition to the first underlying electrode 25*a*. When the coil component 1 is mounted onto the first land electrode 61 of the substrate 60 with the first solder joint 71 therebetween, tensile stress caused by thermal contraction of the first solder joint 71 is exerted on the second underlying electrode 25*b* close to an end portion of the first solder joint 71. Meanwhile, the first underlying electrode 25*a* of the first outer electrode 21*a* is less susceptible to the tensile stress on the first main surface 12*a* of the body 10. Although the second plating electrode 26*b* under the tensile stress is likely to come off easily, the first plating electrode 26*a* is less likely to come off. As mentioned above, the first plating electrode 26*a* is connected directly to the inner conductor or, more specifically, to the first connecting conductor 41. The first plating electrode 26*a* that is less likely to come off produces the effect of eliminating or reducing the possibility that the reliability of the coil component 1 will be impaired. The second plating electrode 26*b* is not connected directly to the inner conductor or, more specifically, to the coil conductors 31, the first connecting conductor 41, and the second connecting conductor 42. Thus, the second plating electrode 26*b*, which can come off easily, would not cause significant impairment of the reliability of the coil component 1.

The electronic component of the present disclosure may be designed such that the first plating electrode and the second plating electrode are in contact with each other.

The first plating electrode 26*a* and the second plating electrode 26*b* in the example illustrated in FIG. 6 are in contact with each other. More specifically, the first plating electrode 26*a* and the second plating electrode 26*b* extend with no gap therebetween when a cross section in a plane extending in the length direction L and the height direction T is viewed. In other words, there is no region where the thickness of the plating electrode between the first underlying electrode 25*a* and the second underlying electrode 25*b* is zero when a cross section in a plane extending in the length direction L and the height direction T is viewed. The first plating electrode 26*a* and the second plating electrode 26*b* extending with no gap therebetween is advantageous in that the first solder joint 71 can spread out easily along the first plating electrode 26*a* and the second plating electrode 26*b*. For this reason, the first plating electrode 26*a* and the second plating electrode 26*b* are easily covered with the first solder joint 71, with no gap between one part and another part of the first solder joint 71 extending over the first plating electrode 26*a* and the second plating electrode 26*b*.

In the example illustrated in FIG. 6, the height position of a surface of the plating electrode is higher in a region in which the plating electrode and the first underlying electrode 25*a* overlap each other in the height direction T than in a region between the first underlying electrode 25*a* and the second underlying electrode 25*b*, where the first main surface 12*a* of the body 10 serves as a reference position in the height direction T. Likewise, the height position of the surface of the plating electrode is higher in a region in which the plating electrode and the second underlying electrode 25*b* overlap each other in the height direction T than in the region between the first underlying electrode 25*a* and the second underlying electrode 25*b*. That is, the height position of the surface of the plating electrode is higher in both the region in which the plating electrode and the first underlying electrode 25*a* overlap each other in the height direction T and the region in which the plating electrode and the second underlying electrode 25*b* overlap each other in the height direction T than in the region between the first underlying electrode 25*a* and the second underlying electrode 25*b*.

The way in which the first plating electrode 26*a* and the second plating electrode 26*b* are in contact with each other is not limited to the example illustrated in FIG. 6, as will be described below.

Figure 7:
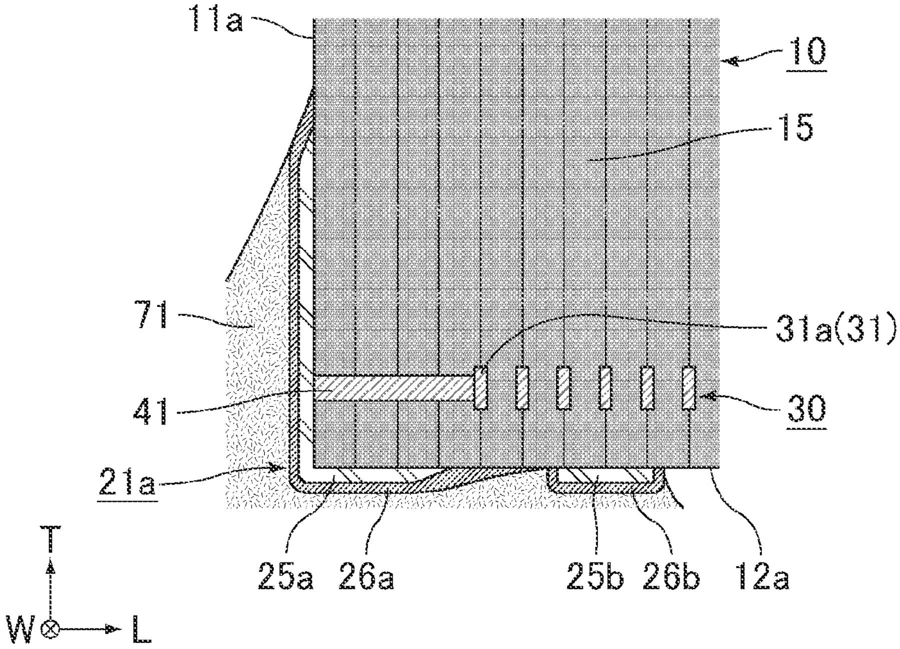
FIG. 7 is an enlarged sectional view of the region B in FIG. 5, schematically illustrating a second example.

FIG. 7 is an enlarged sectional view of the region B in FIG. 5, schematically illustrating a second example.

The first plating electrode 26*a* and the second plating electrode 26*b* in the example illustrated in FIG. 7 have point-to-point contact when a cross section in a plane extending in the length direction L and the height direction T is viewed. In other words, there is only one point where the thickness of the plating electrode between the first underlying electrode 25*a* and the second underlying electrode 25*b* is zero when a cross section in a plane extending in the length direction L and the height direction T is viewed.

The electronic component of the present disclosure may be designed such that the first plating electrode and the second plating electrode are discretely located away from each other.

Figure 8:
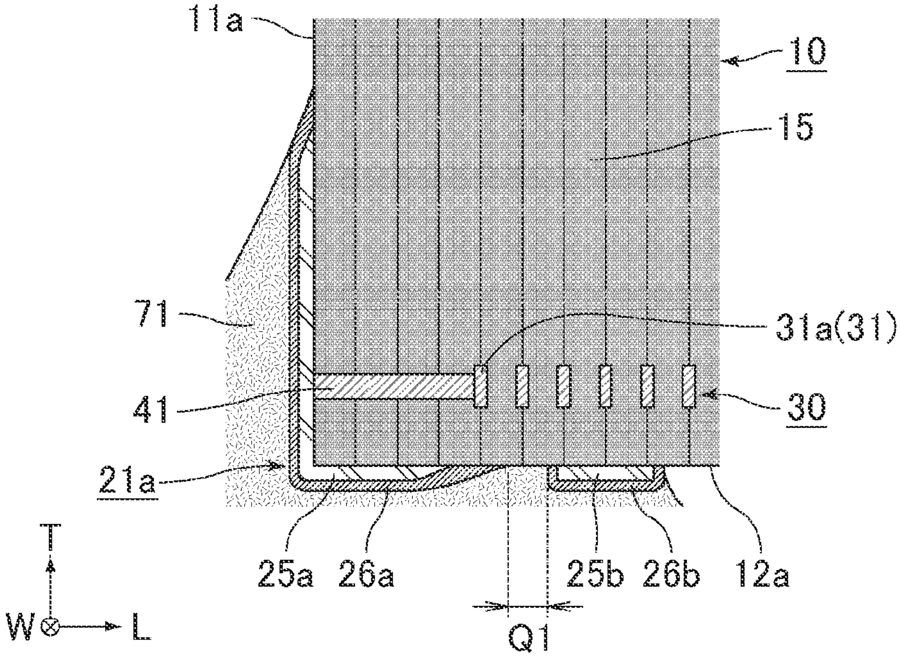
FIG. 8 is an enlarged sectional view of the region B in FIG. 5, schematically illustrating a third example.

FIG. 8 is an enlarged sectional view of the region B in FIG. 5, schematically illustrating a third example.

The first plating electrode 26*a* and the second plating electrode 26*b* in the example illustrated in FIG. 8 are discretely located away from each other. More specifically, there is a region where the thickness of the plating electrode between the first underlying electrode 25*a* and the second underlying electrode 25*b* is zero when a cross section in a plane extending in the length direction L and the height direction T is viewed.

Q1 denotes the distance between the first plating electrode 26*a* and the second plating electrode 26*b* in the length direction L. The distance Q1 is preferably greater than or equal to 3 μm and less than or equal to 20 μm (i.e., from 3 μm to 20 μm) and is more preferably greater than or equal to 5 μm and less than or equal to 15 μm (i.e., from 5 μm to 15 μm).

The distance between the first plating electrode and the second plating electrode in the length direction is herein defined as the shortest distance between them in a cross section in a plane located substantially in the middle of the electronic component (the coil component) in the width direction and extending in the length direction and the height direction.

Although arrangements of the first plating electrode 26*a* and the second plating electrode 26*b* have been described with reference to FIGS. 6, 7, and 8, the first plating electrode 26*a* and the second plating electrode 26*b* are preferably arranged as illustrated in FIG. 6 or 8 and are particularly preferably arranged as illustrated in FIG. 6.

Although examples in which the second underlying electrode 25*b* lies on part of the first main surface 12*a* of the body 10 have been described above with reference to FIGS. 6, 7, and 8, the second underlying electrode 25*b* may be provided to part of the first main surface 12*a* of the body 10, as will be described below.

Figure 9:
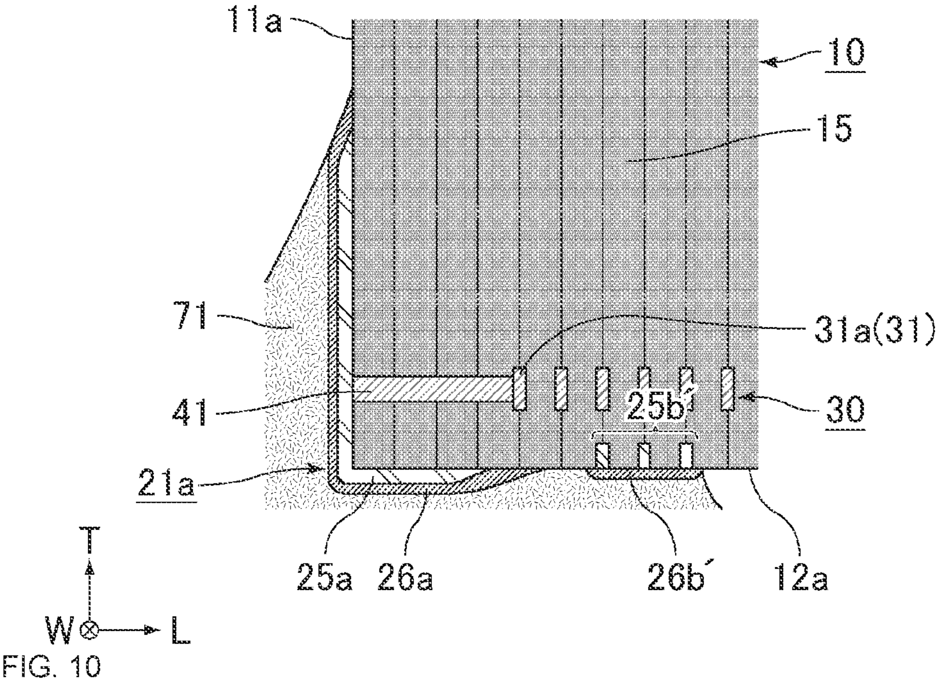
FIG. 9 is an enlarged sectional view of the region B in FIG. 5, schematically illustrating a fourth example.

FIG. 9 is an enlarged sectional view of the region B in FIG. 5, schematically illustrating a fourth example.

The second underlying electrode in the example illustrated in FIG. 9 is denoted by 25*b*'. The second underlying electrode 25*b*' does not lie on part of the first main surface 12*a* of the body 10. The second underlying electrode 25*b*' is composed of layers each of which is located between adjacent ones of the insulating layers 15 arranged side by side in the stacking direction or, more specifically, in the length direction L and is exposed at part of the first main surface 12*a* of the body 10.

It is clear from FIG. 9 that the layers constituting the second underlying electrode are each located between adjacent insulating layers arranged side by side in the stacking direction. More specifically, the layers constituting the second underlying electrode each have a center line extending in a direction orthogonal to the stacking direction of the insulating layers, that is, in the height direction in FIG. 9, and each center line passes through the corresponding coil conductor when a cross section in a plane extending in the length direction and the height direction is viewed as illustrated in FIG. 9.

The second underlying electrode 25*b*' is covered with a second plating electrode 26*b*', and the first plating electrode 26*a* and the second plating electrode 26*b*' are discretely located away from each other.

The example illustrated in FIG. 9 is otherwise identical to the example illustrated in FIG. 8.

Although the first plating electrode 26*a* and the second plating electrode 26*b*' in the example illustrated in FIG. 9 are discretely located away from each other, the first plating electrode 26*a* and the second plating electrode 26*b*' may be in contact with each other. In the case in which the first plating electrode 26*a* and the second plating electrode 26*b*' are in contact with each other, the first plating electrode 26*a* and the second plating electrode 26*b*' may extend with no gap therebetween or may have point-to-point contact when a cross section in a plane extending in the length direction L and the height direction T is viewed.

It is preferred that the second outer electrode 22*a* be structurally identical to the first outer electrode 21*a*. That is, the second outer electrode 22*a* preferably includes a first underlying electrode, a second underlying electrode, a first plating electrode, and a second plating electrode. In this case, the first underlying electrode lies on part of the first main surface 12*a* of the body 10 and is connected directly to the inner conductor or, more specifically, to the second connecting conductor 42. The second underlying electrode is provided to part of the first main surface 12*a* of the body 10 in a manner so as to be discretely located away from the first underlying electrode and closer than the first underlying electrode to the center of the body 10 in the length direction L and is not connected directly to the inner conductor or, more specifically, to the coil conductors 31, the first connecting conductor 41, and the second connecting conductor 42. The first underlying electrode is covered with the first plating electrode. The second underlying electrode is covered with the second plating electrode.

The first plating electrode and the second plating electrode of the second outer electrode 22*a* may be in contact with each other or may be discretely located away from each other. In the case in which the first plating electrode and the second plating electrode of the second outer electrode 22*a* are in contact with each other, the first plating electrode and the second plating electrode may extend with no gap therebetween or may have point-to-point contact when a cross section in a plane extending in the length direction L and the height direction T is viewed.

The second solder joint 72 is preferably similar to the first solder joint 71; that is, it is preferred that the first plating electrode and the second plating electrode of the second outer electrode 22*a* be covered with the second solder joint 72, with no gap between one part and another part of the second solder joint 72 extending over the first plating electrode and the second plating electrode.

A method for producing a coil component that is the electronic component according to Embodiment 1 of the present disclosure is as follows.

Step of Preparing Magnetic Material

First, $Fe_2O_3$, NiO, ZnO, and CuO are weighed out to a predetermined ratio.

Then, the weighed materials are wet mixed and pulverized to prepare slurry. The mixing time of the weighed materials is, for example, more than or equal to four hours and less than or equal to eight hours (i.e., from four hours to eight hours).

The slurry obtained is dried and is then calcined. The calcination temperature is, for example, higher than or equal to 700° C. and lower than or equal to 800° C. (i.e., from 700° C. to 800° C.). The calcination time is, for example, more than or equal to two hours and less than or equal to five hours (i.e., from two hours to five hours).

In this way, a magnetic material in powder form or, more specifically, a ferrite material in powder form is prepared.

The ferrite material is preferably an Ni—Cu—Zn ferrite material.

The Ni—Cu—Zn ferrite material preferably has an Fe content of 40 mol % or more and 49.5 mol % or less (i.e., from 40 mol % to 49.5 mol %) in terms of $Fe_2O_3$, an Ni content of 10 mol % or more and 45 mol % or less (i.e., from 10 mol % to 45 mol %) in terms of NiO, a Zn content of 2 mol % or more and 35 mol % or less (i.e., from 2 mol % to 35 mol %) in terms of ZnO, and a Cu content of 6 mol % or more and 13 mol % or less (i.e., from 6 mol % to 13 mol %) in terms of CuO, provided that the total amount of the Ni—Cu—Zn ferrite material is 100 mol %.

The Ni—Cu—Zn ferrite material may contain additive elements, such as Co, Bi, Sn, and Mn, and may also contain inevitable impurities.

Step of Preparing Green Sheet

First, the magnetic material is mixed with an organic binder (e.g., polyvinyl butyral resin), an organic solvent (e.g., ethanol and toluene), and a plasticizer. The mixture is then pulverized to prepare slurry. The slurry obtained is formed into a sheet of a predetermined thickness by using, for example, the doctor blade technique. The sheet is then stamped into a predetermined shape, thus being formed into a green sheet.

Instead of being made of the magnetic material, the green sheet may be made of a non-magnetic material (e.g., a borosilicate glass material) or a mixture of a magnetic material and a non-magnetic material.

Step of Forming Conductor Patterns

First, laser beams are applied to predetermined points on the green sheet to form via holes.

A conductive paste (e.g., an Ag paste) is then applied to a surface of the green sheet by, for example, screen printing in such a manner that the via holes are filled with the conductive paste. In this way, conductor patterns for via conductors are formed in the via holes of the green sheet, and conductor patterns for coil conductors are formed on the surface of the green sheet in a manner so as to be connected to the conductor patterns for via conductors. Coil sheets with the conductor pattern for coil conductors and the conductor pattern for via conductors are obtained from the green sheet accordingly. Each coil sheet is provided with the conductor pattern for the corresponding coil conductor illustrated in FIGS. 3 and 4 and the conductor pattern for the corresponding via conductor illustrated in FIGS. 3 and 4.

Besides the coil sheets, via sheets with conductive patterns for via conductors are obtained by applying a conductive paste (e.g., an Ag paste) to a green sheet by, for example, screen printing in such a manner that via holes of the green sheet are filled with the conductive paste. Each via sheet is provided with the conductor pattern for the corresponding via conductor illustrated in FIGS. 3 and 4.

Step of Preparing Multilayer Block

The coil sheets and the via sheets are arranged in the order illustrated in FIGS. 3 and 4 to form a stack, which is then formed into a multilayer block by thermocompression bonding.

Step of Preparing Body and Coil

First, the multilayer block is cut into chips of a predetermined size with, for example, a dicing machine.

The individual chips are then fired. The firing temperature is, for example, higher than or equal to 900° C. and lower than or equal to 920° C. (i.e., from 900° C. to 920° C.). The firing time is, for example, more than or equal to two hours and less than or equal to four hours (i.e., from two hours to four hours).

The individual chips are fired such that the green sheets or, more specifically, the coil sheets and the via sheets are formed into insulating layers. A body including the insulating layers arranged in the stacking direction or, more specifically, the insulating layers stacked in the length direction is prepared accordingly.

The individual chips are fired such that the conductor patterns for coil conductors on the coil sheets are formed into coil conductors, and the conductor patterns for via conductors in the coil sheets are formed into via conductors. A coil including the coil conductors stacked in the length direction and electrically connected to each other by the via conductors is prepared accordingly.

The body and the coil located inside the body are prepared by following these steps. Both the stacking direction of the insulating layers and the axial direction of the coil are parallel to the mounting surface, that is, to the first main surface of the body. More specifically, these directions coincide with the length direction.

The individual chips are fired such that the conductor patterns for via conductors in the via sheets are formed into via conductors. A first connecting conductor and a second connecting conductor each including the via conductors stacked in the length direction and electrically connected to each other are prepared accordingly. The first connecting conductor is exposed at the first end surface of the body. The second connecting conductor is exposed at the second end surface of the body.

These steps may be followed by barrel polishing or the like, in which case corners and ridges of the body are rounded.

Step of Forming Outer Electrodes

First, a conductive paste containing Ag and glass frit is spread to form a layer of a predetermined thickness, and the body placed in a slanting position is then immersed in the paste to form a first coating lying on part of the first main surface of the body and extending continuously over part of the first end surface, part of the first side surface, and part of the second side surface. The first coating is connected directly to the first connecting conductor exposed at the first end surface of the body.

A conductive paste containing Ag and glass frit is applied to part of the first main surface of the body to form a second coating that lies on part of the first main surface of the body in a manner so as to be discretely located away from the first coating, with the second coating being closer than the first coating to the center of the body in the length direction. The second coating is not connected directly to the coil conductors, the first connecting conductor, and the second connecting conductor.

The first coating and the second coating may be formed simultaneously or at different times.

In the case where the first coating and the second coating are formed at different times, the first coating and the second coating may be formed in this order or in inverse order.

The first coating is baked to form a first underlying electrode lying on part of the first main surface of the body and extending continuously over part of the first end surface, part of the first side surface, and part of the second side surface. The first underlying electrode is connected directly to the first connecting conductor.

The second coating is baked to form a second underlying electrode that lies on part of the first main surface of the body in a manner so as to be discretely located away from the first underlying electrode, with the second underlying electrode being closer than the first underlying electrode to the center of the body in the length direction. The second underlying electrode is not connected directly to the coil conductors, the first connecting conductor, and the second connecting conductor.

For example, the first coating and the second coating are baked in the temperature range of 800° C. to 820° C.

Then, an Ni plating electrode and an Sn plating electrode are sequentially formed on the first underlying electrode by, for example, electrolytic plating. The Ni plating electrode and the Sn plating electrode constitute a first plating electrode with which the first underlying electrode is covered.

Likewise, an Ni plating electrode and an Sn plating electrode are sequentially formed on the second underlying electrode by, for example, electrolytic plating. The Ni plating electrode and the Sn plating electrode constitute a second plating electrode with which the second underlying electrode is covered.

The first plating electrode and the second plating electrode are formed in a manner so as to adjust the growth dimension of plating such that the first plating electrode and the second plating electrode may be in contact with each other as illustrated in FIG. 6 or 7 or may be discretely located away from each other as illustrated in FIG. 8.

The procedure by which to form the second underlying electrode on part of the first main surface of the body has been described above. Alternatively, the second underlying electrode may be exposed at part of the first main surface of the body by the following procedure.

In the aforementioned step of forming conductor patterns, a conductive paste containing Ag and glass frit is applied to a surface including the periphery of each green sheet to form a conductor pattern for a second underlying electrode.

The conductor pattern for a second underlying electrode may be formed on the coil sheets or may be formed on the coil sheets and the via sheets.

The aforementioned step of preparing a multilayer block is followed by the step of preparing a body and a coil, in which individual chips are fired. Consequently, the conductor pattern for a second underlying electrode is formed into a second underlying electrode. The second connecting conductor obtained in this way is exposed at part of the first main surface of the body.

The body having the second underlying electrode formed therein then undergoes the aforementioned process of forming a first underlying electrode. Subsequently, a first plating electrode and a second plating electrode are formed so as to cover the first underlying electrode and the second underlying electrode, respectively. The first plating electrode and the second plating electrode are formed in a manner so as to adjust the growth dimension of plating such that the first plating electrode and the second plating electrode may be in contact with each other or may be discretely located away from each other as illustrated in FIG. 9.

These electrodes constitute a first outer electrode, at least part of which is electrically connected to the coil with the first connecting conductor therebetween.

With the exception of the following processes, the same procedure as above is taken to form a second outer electrode, at least part of which is electrically connected to the coil with the second connecting conductor therebetween. A first underlying electrode of the second outer electrode is formed such that the first underlying electrode lies on part of the main surface of the body and extends continuously over part of the second end surface, part of the first side surface, and part of the second side surface. The first underlying electrode is connected directly to the second connecting conductor. A second underlying electrode of the second outer electrode is formed such that the second underlying electrode lies on part of the first main surface of the body in a manner so as to be discretely located away from the first underlying electrode, with the second underlying electrode being closer than the first underlying electrode to the center of the body in the length direction. The second underlying electrode is not connected directly to the coil conductors, the first connecting conductor, and the second connecting conductor.

In this way, a coil component that is the electronic component according to Embodiment 1 of the present disclosure is obtained.

The coil component that is the electronic component according to Embodiment 1 of the present disclosure is mounted onto the first land electrode and the second land electrode on a substrate with the first solder joint and the second solder joint to obtain the electronic device according to Embodiment 1 of the present disclosure.

As the first outer electrode of the coil component that is the electronic component according to Embodiment 1 of the present disclosure, an example has been described in which the first outer electrode lies on part of the first main surface of the body and extends continuously over part of the first end surface, part of the first side surface, and part of the second side surface. Alternatively, the first outer electrode may lie on the first end surface and may extend continuously over part of the first main surface, part of the second main surface, part of the first side surface, and part of the second side surface.

As the second outer electrode of the coil component that is the electronic component according to Embodiment 1 of the present disclosure, an example has been described in which the second outer electrode lies on part of the first main surface of the body and extends continuously over part of the second end surface, part of the first side surface, and part of the second side surface. Alternatively, the second outer electrode may lie on the second end surface and may extend continuously over part of the first main surface, part of the second main surface, part of the first side surface, and part of the second side surface.

As the coil component that is the electronic component according to Embodiment 1 of the present disclosure, an example has been described in which both the stacking direction of the insulating layers and the axial direction of the coil are parallel to the mounting surface, that is, to the first main surface of the body. Alternatively, the stacking direction of the insulating layers and the axial direction of the coil may be orthogonal to the mounting surface, that is, to the first main surface of the body. In this case, the first outer electrode preferably lies on the first end surface of the body and preferably extends continuously over part of the first main surface, part of the second main surface, part of the first side surface, and part of the second side surface. The second outer electrode preferably lies on the second end surface of the body and preferably extends continuously over part of the first main surface, part of the second main surface, part of the first side surface, and part of the second side surface.

Embodiment 2

According to Embodiment 2 of the present disclosure, the electronic component is designed as follows. The first underlying electrode lying on part of the first main surface extends continuously over part of the first end surface. The underlying electrode includes, in addition to the first underlying electrode and the second underlying electrode, a third underlying electrode that is provided to part of the first end surface in a manner so as to be discretely located away from the first underlying electrode, with the third underlying electrode being closer than the first underlying electrode to the second main surface of the body in the height direction. The third underlying electrode is not connected directly to the inner conductor. The plating electrode includes, in addition to the first plating electrode and the second underlying electrode, a third plating electrode with which the third underlying electrode is covered. The electronic component according to Embodiment 2 of the present disclosure is otherwise identical to the electronic component according to Embodiment 1 of the present disclosure.

According to Embodiment 2 of the present disclosure, the electronic device is designed as follows. The first underlying electrode lying on part of the first main surface extends continuously over part of the first end surface. The underlying electrode includes, in addition to the first underlying electrode and the second underlying electrode, a third underlying electrode that is provided to part of the first end surface in a manner so as to be discretely located away from the first underlying electrode, with the third underlying electrode being closer than the first underlying electrode to the second main surface of the body in the height direction. The third underlying electrode is not connected directly to the inner conductor. The plating electrode includes, in addition to the first plating electrode and the second underlying electrode, a third plating electrode with which the third underlying electrode is covered. The first plating electrode and the third plating electrode are covered with the solder, with no gap between one part and another part of the solder extending over the first and third plating electrodes. The electronic device according to Embodiment 2 of the present disclosure is otherwise identical to the electronic device according to Embodiment 1 of the present disclosure.

As with the electronic component according to Embodiment 1 of the present disclosure, the electronic component according to Embodiment 2 of the present disclosure is a coil component. As the electronic device according to Embodiment 2 of the present disclosure, an example will be described in which the coil component that is the electronic component according to Embodiment 2 of the present disclosure is mounted on the first land electrode and the second land electrode on the substrate of the electronic device with the first solder joint and the second solder joint.

Figure 10:
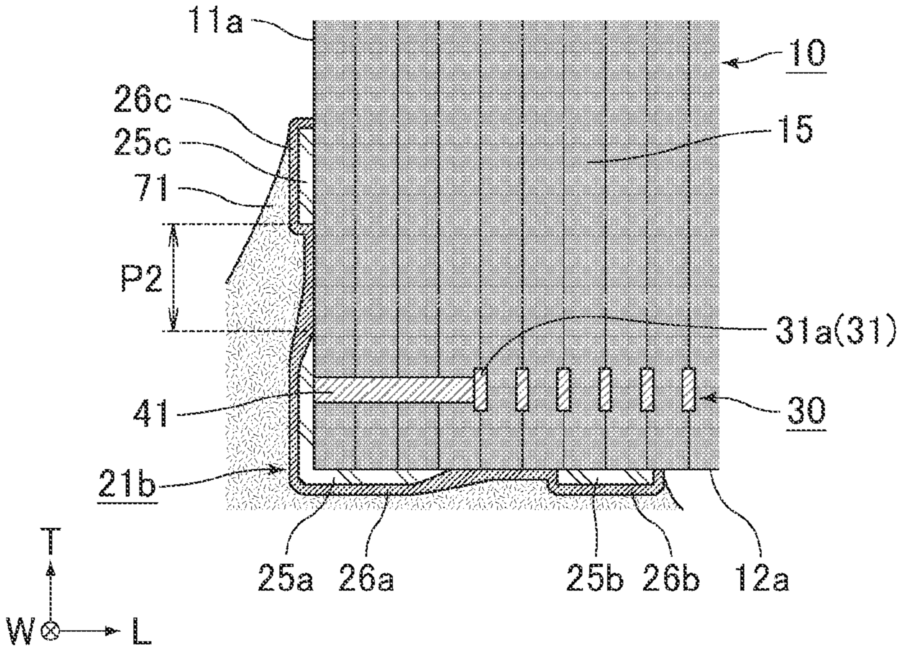
FIG. 10 is an enlarged sectional view of a region of an electronic device according to Embodiment 2 of the present disclosure, schematically illustrating a first example.

FIG. 10 is an enlarged sectional view of a region of the electronic device according to Embodiment 2 of the present disclosure, schematically illustrating a first example. The overall view of the electronic device according to Embodiment 2 of the present disclosure is substantially identical to the one in FIG. 5.

In the example illustrated in FIG. 10, a first outer electrode 21*b* includes a first underlying electrode 25*a*, a second underlying electrode 25*b*, a first plating electrode 26*a*, and a second plating electrode 26*b* and also includes a third underlying electrode 25*c* and a third plating electrode 26*c*.

In the example illustrated in FIG. 10, the arrangement of the first plating electrode 26*a* and the second plating electrode 26*b* on the first main surface 12*a* of the body 10 is similar to the arrangement illustrated in FIG. 6. Alternatively, the arrangement of the first plating electrode 26*a* and the second plating electrode 26*b* may be similar to the arrangement illustrated in FIG. 7, 8, or 9.

The third underlying electrode 25*c* is provided to part of the first end surface 11*a* of the body 10 in a manner so as to be discretely located away from the first underlying electrode 25*a* and closer than the first underlying electrode 25*a* to the second main surface 12*b* of the body 10 in the height direction T. More specifically, the third underlying electrode 25*c* lies on part of the first end surface 11*a* of the body 10 in a manner so as to be discretely located away from the first underlying electrode 25*a* and closer than the first underlying electrode 25*a* to the second main surface 12*b* of the body 10 in the height direction T.

The third underlying electrode 25*c* is not connected directly to the inner conductor or, more specifically, to the coil conductors 31, the first connecting conductor 41, and the second connecting conductor 42.

P2 denotes the distance between the first underlying electrode 25*a* and the third underlying electrode 25*c* in the height direction T. The distance P2 is preferably greater than or equal to 6 μm and less than or equal to 66 μm (i.e., from 6 μm to 66 μm) and is more preferably greater than or equal to 36 μm and less than or equal to 66 μm (i.e., from 36 μm to 66 μm).

The distance between the first underlying electrode and the third underlying electrode in the height direction is herein defined as the shortest distance between them in a cross section in a plane located substantially in the middle of the electronic component (the coil component) in the width direction and extending in the length direction and the height direction.

As with the first underlying electrode 25*a* and the second underlying electrode 25*b*, the third underlying electrode 25*c* preferably contains Ag.

The third underlying electrode 25*c* is covered with the third plating electrode 26*c*. More specifically, the third plating electrode 26*c* is in contact with the third underlying electrode 25*c* and the first end surface 11*a* of the body 10 when a cross section in a plane extending in the length direction L and the height direction T is viewed.

As with the first plating electrode 26*a* and the second plating electrode 26*b*, the third plating electrode 26*c* preferably contains Ni and/or Sn.

As with the first plating electrode 26*a* and the second plating electrode 26*b*, the third plating electrode 26*c* may be a monolayer structure or a multilayer structure and is preferably a multiplayer structure. In the case where the third plating electrode 26*c* is a multilayer structure, the third plating electrode 26*c* preferably includes an Ni-plating electrode on the third underlying electrode 25*c* and an Sn-plating electrode on the Ni-plating electrode.

The first plating electrode 26*a* and the second plating electrode 26*b* are covered with the first solder joint 71, with no gap between one part and another part of the first solder joint 71 extending over the first plating electrode 26*a* and the second plating electrode 26*b*. Likewise, the first plating electrode 26*a* and the third plating electrode 26*c* are covered with the first solder joint 71, with no gap between one part and another part of the first solder joint 71 extending over the first plating electrode 26*a* and the third plating electrode 26*c*. More specifically, the first solder joint 71 is in contact with the third plating electrode 26*c* as well as with the first plating electrode 26*a* and the second plating electrode 26*b* when a cross section in a plane extending in the length direction L and the height direction T is viewed.

When the first solder joint 71 spreads out along the first main surface 12*a* and the first end surface 11*a* of the body 10 as illustrated in FIG. 10, tensile stress caused by thermal contraction of the first solder joint 71 is likely to be exerted in the length direction L toward the first end surface 11*a* of the body 10 (i.e., to the left side in FIG. 10) and can also be exerted in the height direction T toward the first main surface 12*a* of the body 10 (i.e., to the lower side in FIG. 10).

Although the second plating electrode 26*b* under the tensile stress exerted in the length direction L toward the first end surface 11*a* of the body 10 is likely to come off easily, the first plating electrode 26*a* is less likely to come off. As mentioned above, this is due to the first outer electrode 21*b* including the second underlying electrode 25*b* in addition to the first underlying electrode 25*a*.

The tensile stress exerted in the height direction T toward the first main surface 12*a* of the body 10 is exerted on the third underlying electrode 25*c* close to an end portion of the first solder joint 71. Meanwhile, the first underlying electrode 25*a* of the first outer electrode 21*b* is less susceptible to the tensile stress on the first end surface 11*a* of the body 10. This is due to the presence of the third underlying electrode 25*c* of the first outer electrode 21*b*. Although the third plating electrode 26*c* under the tensile stress is likely to come off easily, the first plating electrode 26*a* is less likely to come off.

That is, the first plating electrode 26*a* is less likely to come off when the coil component designed as illustrated in FIG. 10 is mounted onto the substrate with the first solder joint 71 therebetween. This produces the effect of eliminating or reducing the possibility that the reliability of the coil component will be impaired. The second plating electrode 26*b* and the third plating electrode 26*c* of the coil component designed as illustrated in FIG. 10 are not connected directly to the inner conductor or, more specifically, to the coil conductors 31, the first connecting conductor 41, and the second connecting conductor 42. Thus, the second plating electrode 26*b* and the third plating electrode 26*c*, which can come off easily, would not cause significant impairment of the reliability of the coil component.

The electronic component of the present disclosure may be designed such that the first plating electrode and the third plating electrode are in contact with each other.

The first plating electrode 26*a* and the third plating electrode 26*c* in the example illustrated in FIG. 10 are in contact with each other. More specifically, the first plating electrode 26*a* and the third plating electrode 26*c* extend with no gap therebetween when a cross section in a plane extending in the length direction L and the height direction T is viewed. In other words, there is no region where the thickness of the plating electrode between the first underlying electrode 25*a* and the third underlying electrode 25*c* is zero when a cross section in a plane extending in the length direction L and the height direction T is viewed. The first plating electrode 26*a* and the third plating electrode 26*c* extending with no gap therebetween is advantageous in that the first solder joint 71 can spread out easily along the first plating electrode 26*a* and the third plating electrode 26*c*. For this reason, the first plating electrode 26*a* and the third plating electrode 26*c* are easily covered with the first solder joint 71, with no gap between one part and another part of the first solder joint 71 extending over the first plating electrode 26*a* and the third plating electrode 26*c*.

In the example illustrated in FIG. 10, the height position of a surface of the plating electrode is higher in a region in which the plating electrode and the first underlying electrode 25*a* overlap each other in the length direction L than in a region between the first underlying electrode 25*a* and the third underlying electrode 25*c*, where the first end surface 11*a* of the body 10 serves as a reference height position in the length direction L. Likewise, the height position of the surface of the plating electrode is higher in a region in which the plating electrode and the third underlying electrode 25*c* overlap each other in the length direction L than in the region between the first underlying electrode 25*a* and the third underlying electrode 25*c*. That is, the height position of the surface of the plating electrode is higher in both the region in which the plating electrode and the first underlying electrode 25*a* overlap each other in the length direction L and the region in which the plating electrode and the third underlying electrode 25*c* overlap each other in the length direction L than in the region between the first underlying electrode 25*a* and the third underlying electrode 25*c*.

The way in which the first plating electrode 26*a* and the third plating electrode 26*c* are in contact with each other is not limited to the example illustrated in FIG. 10, as will be described below.

Figure 11:
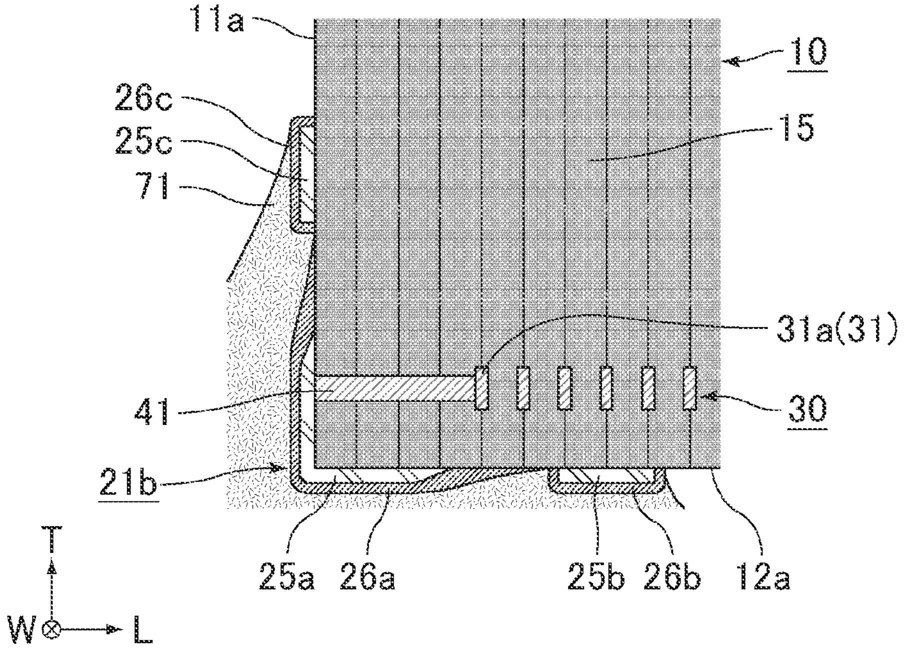
FIG. 11 is an enlarged sectional view of a region of the electronic device according to Embodiment 2 of the present disclosure, schematically illustrating a second example.

FIG. 11 is an enlarged sectional view of a region of the electronic device according to Embodiment 2 of the present disclosure, schematically illustrating a second example.

The first plating electrode 26*a* and the third plating electrode 26*c* in the example illustrated in FIG. 11 have point-to-point contact when a cross section in a plane extending in the length direction L and the height direction T is viewed. In other words, there is only one point where the thickness of the plating electrode between the first underlying electrode 25*a* and the third underlying electrode 25*c* is zero when a cross section in a plane extending in the length direction L and the height direction T is viewed.

In the example illustrated in FIG. 11, the arrangement of the first plating electrode 26*a* and the second plating electrode 26*b* on the first main surface 12*a* of the body 10 is similar to the arrangement illustrated in FIG. 7. Alternatively, the arrangement of the first plating electrode 26*a* and the second plating electrode 26*b* may be similar to the arrangement illustrated in FIG. 6, 8, or 9.

The electronic component of the present disclosure may be designed such that the first plating electrode and the third plating electrode are discretely located away from each other.

Figure 12:
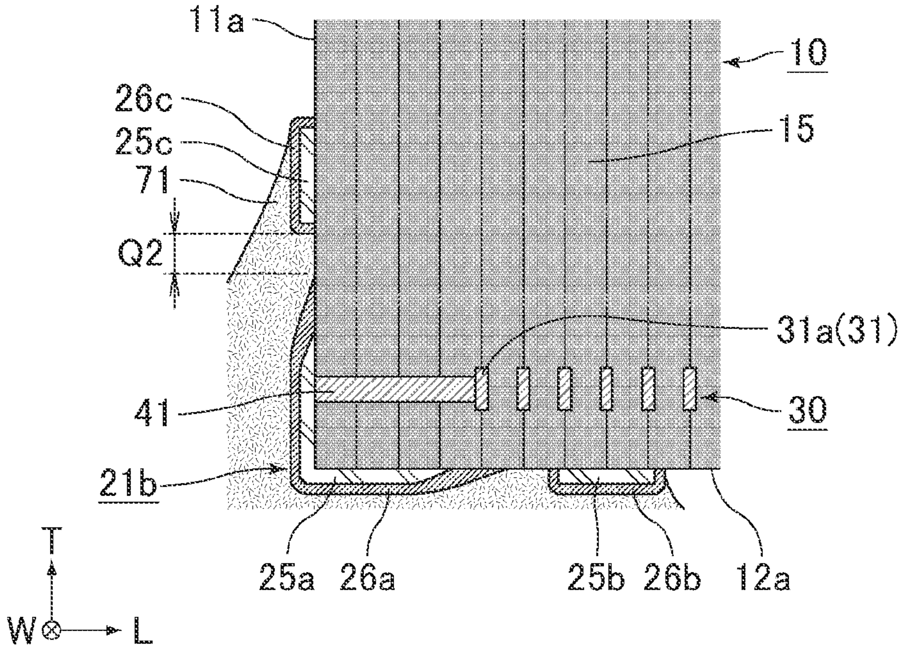
FIG. 12 is an enlarged sectional view of a region of the electronic device according to Embodiment 2 of the present disclosure, schematically illustrating a third example.

FIG. 12 is an enlarged sectional view of a region of the electronic device according to Embodiment 2 of the present disclosure, schematically illustrating a third example.

The first plating electrode 26*a* and the third plating electrode 26*c* in the example illustrated in FIG. 12 are discretely located away from each other. More specifically, there is a region where the thickness of the plating electrode between the first underlying electrode 25*a* and the third underlying electrode 25*c* is zero when a cross section in a plane extending in the length direction L and the height direction T is viewed.

Q2 denotes the distance between the first plating electrode 26*a* and the third plating electrode 26*c* in the height direction T. The distance Q2 is preferably greater than or equal to 3 μm and less than or equal to 20 μm (i.e., from 3 μm to 20 μm) and is more preferably greater than or equal to 5 μm and less than or equal to 15 μm (i.e., from 5 μm to 15 μm).

The distance between the first plating electrode and the third plating electrode in the height direction is herein defined as the shortest distance between them in a cross section in a plane located substantially in the middle of the electronic component (the coil component) in the width direction and extending in the length direction and the height direction.

In the example illustrated in FIG. 12, the arrangement of the first plating electrode 26*a* and the second plating electrode 26*b* on the first main surface 12*a* of the body 10 is similar to the arrangement illustrated in FIG. 8. Alternatively, the arrangement of the first plating electrode 26*a* and the second plating electrode 26*b* may be similar to the arrangement illustrated in FIG. 6, 7, or 9.

Although arrangements of the first plating electrode 26*a* and the third plating electrode 26*c* have been described with reference to FIGS. 10, 11, and 12, the first plating electrode 26*a* and the third plating electrode 26*c* are preferably arranged as illustrated in FIG. 10 or 12 and are particularly preferably arranged as illustrated in FIG. 10.

Although examples in which the third underlying electrode 25*c* lies on part of the first end surface 11*a* of the body 10 have been described above with reference to FIGS. 10, 11, and 12, the third underlying electrode 25*c* may be provided to part of the first end surface 11*a* of the body 10 in a different manner; that is, the third underlying electrode may be exposed at part of the first end surface of the body. In this case as well, the first plating electrode and the third plating electrode may be in contact with each other or may be discretely located away from each other.

It is preferred that the second outer electrode be structurally identical to the first outer electrode 21*b*. That is, the second outer electrode preferably includes a third underlying electrode and a third plating electrode as well as the first underlying electrode, the second underlying electrode, the first plating electrode, and the second plating electrode. The first underlying electrode lies on part of the first main surface 12*a* of the body 10 and extends continuously over part of the second end surface 11*b*. The third underlying electrode is provided to part of the second end surface 11*b* of the body 10 in a manner so as to be discretely located away from the first underlying electrode and closer than the first underlying electrode to the second main surface 12*b* of the body 10 in the height direction T and is not connected directly to the inner conductor or, more specifically to the coil conductors 31, the first connecting conductor 41, and the second connecting conductor 42. The third underlying electrode is covered with the third plating electrode.

The first plating electrode and the third plating electrode of the second outer electrode may be in contact with each other or may be discretely located away from each other. In the case in which the first plating electrode and the third plating electrode of the second outer electrode are in contact with each other, the first plating electrode and the third plating electrode may extend with no gap therebetween or may have point-to-point contact when a cross section in a plane extending in the length direction L and the height direction T is viewed.

The second solder joint is preferably similar to the first solder joint 71. More specifically, it is preferred that the first plating electrode and the third plating electrode of the second outer electrode be covered with the second solder joint, with no gap between one part and another part of the second solder joint extending over the first and third plating electrodes.

For example, the third underlying electrode is formed in much the same way as the second underlying electrode, and the third plating electrode is formed in much the same way as the second plating electrode. The procedure for producing the coil component that is the electronic component according to Embodiment 2 of the present disclosure is otherwise similar to the procedure for producing the coil component that is the electronic component according to Embodiment 1 of the present disclosure.

The coil component that is the electronic component according to Embodiment 2 of the present disclosure is mounted onto the first land electrode and the second land electrode on a substrate with the first solder joint and the second solder joint to obtain the electronic device according to Embodiment 2 of the present disclosure.

The electronic component according to Embodiment 1 of the present disclosure and the electronic component according to Embodiment 2 of the present disclosure are each designed such that the first underlying electrode also extends over part of the first side surface of the body and part of the second side surface of the body. In some embodiments, the electronic component according to the present disclosure may be designed such that the first underlying electrode lying on part of the first main surface of the body extends continuously over part of at least one of the first side surface and the second side surface. The underlying electrode may include, in addition to the first to third underlying electrodes, a fourth underlying electrode that is provided to part of at least one of the first side surface and the second side surface in a manner so as to be discretely located away from the first underlying electrode. The fourth underlying electrode is not connected directly to the inner conductor. The plating electrode may include, in addition to the first to third plating electrode, a fourth plating electrode with which the fourth underlying electrode is covered. In the case where the electronic component is designed as above, tensile stress caused by thermal contraction of the solder can be exerted on the outer electrode on at least one of the first side surface and the second side surface of the body. In this case, the tensile stress is exerted on the fourth underlying electrode on at least one of the first side surface and the second side surface of the body. Meanwhile, the first underlying electrode is less susceptible to the tensile stress. Although the fourth plating electrode under the tensile stress is likely to come off easily, the first plating electrode is less likely to come off.

Embodiments have been described in which the electronic component according to the present disclosure is a coil component. Alternatively, the electronic component according to the present disclosure may be a multilayer ceramic electronic component, such as a multilayer ceramic capacitor, a multilayer thermistor, a multilayer varistor, a multilayer LC filter, or a multilayer piezoelectric filter. Still alternatively, the electronic component according to the present disclosure may be an electronic component other than a multilayer ceramic electronic component.

EXAMPLES

The electronic component according to the present disclosure and the electronic device according to the present disclosure will be more specifically described below by way of examples using simulation models. The following examples should not be construed as limiting the scope of the present disclosure.

Model 1

Figure 13:
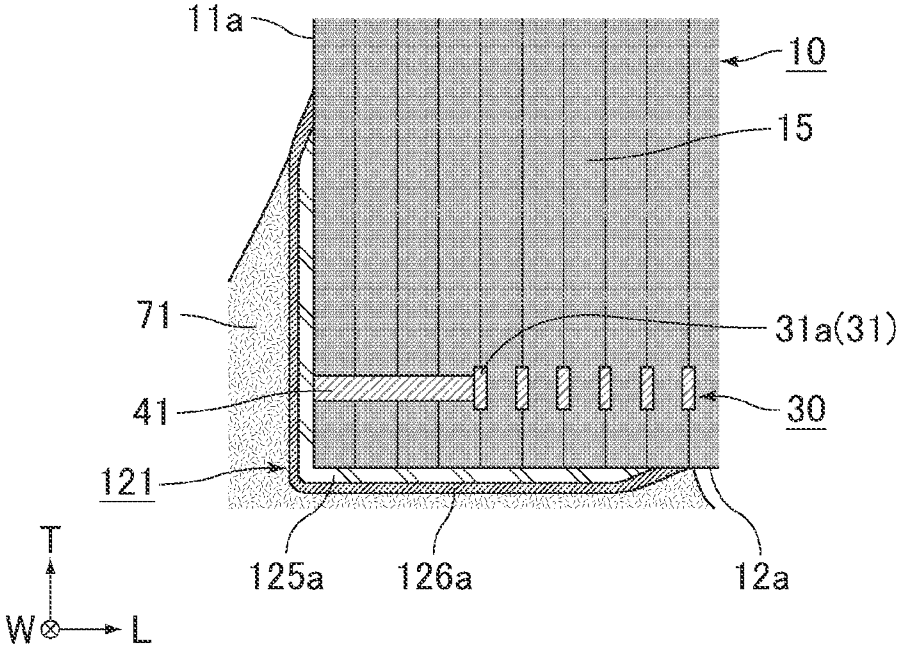
FIG. 13 is a schematic sectional view of Model 1 of the electronic device.

FIG. 13 is a schematic sectional view of Model 1 of the electronic device.

Referring to FIG. 13, which illustrates Model 1 of the electronic device, a first outer electrode 121 includes a first underlying electrode 125*a* and a first plating electrode 126*a*.

The first underlying electrode 125*a* lies on part of the first main surface 12*a* of the body 10. The first underlying electrode 125*a* lying on part of the first main surface 12*a* of the body 10 extends continuously over part of the first end surface 11*a*.

The first underlying electrode 125*a* is connected directly to the inner conductor or, more specifically, to the first connecting conductor 41 exposed at the first end surface 11*a* of the body 10.

Model 1 of the electronic device is structurally identical to the examples illustrated in FIGS. 6, 7, and 8 except that first outer electrode 121 includes neither the second underlying electrode nor the second plating electrode.

Model 1 of the electronic device is designed such that the distance between the tip of the first underlying electrode 125*a* and the tip of the first plating electrode 126*a* in the length direction L on the first main surface 12*a* of the body 10 is 30 μm.

Model 2

Model 2 of the electronic device is structurally identical to the example illustrated in FIG. 8.

Model 2 of the electronic device is designed as follows.

- the distance between the first underlying electrode and the second underlying electrode in the length direction: 42 μm
- the distance between the first plating electrode and the second plating electrode in the length direction: 10 μm
- the distance between the tip of the first underlying electrode and the tip of the first plating electrode in the length direction: 30 μm Model 3

Model 3 of the electronic device is structurally identical to the example illustrated in FIG. 7.

Model 3 of the electronic device is designed as follows.

- the distance between the first underlying electrode and the second underlying electrode in the length direction: 42 μm the distance between the tip of the first underlying electrode and the tip of the first plating electrode in the length direction: 40 μm Model 4

Model 4 of the electronic device is structurally identical to the example illustrated in FIG. 6.

Model 4 of the electronic device is designed as follows.

the distance between the first underlying electrode and the second underlying electrode in the length direction: 42 μm Model 5

Model 5 of the electronic device is structurally identical to the example illustrated in FIG. 9.

Model 5 of the electronic device is designed as follows.

the distance between the first underlying electrode and the second underlying electrode in the length direction: 42 μm the distance between the first plating electrode and the second plating electrode in the length direction: 10 μm the distance between the tip of the first underlying electrode and the tip of the first plating electrode in the length direction: 30 μm Model 6

Model 6 of the electronic device is structurally identical to the example illustrated in FIG. 9 except that the first plating electrode and the second plating electrode have point-to-point contact.

Model 6 of the electronic device is designed as follows.

the distance between the first underlying electrode and the second underlying electrode in the length direction: 42 μm the distance between the tip of the first underlying electrode and the tip of the first plating electrode in the length direction: 40 μm Model 7

Model 7 of the electronic device is structurally identical to the example illustrated in FIG. 9 except that the first plating electrode and the second plating electrode extend with no gap therebetween.

Model 7 of the electronic device is designed as follows.

the distance between the first underlying electrode and the second underlying electrode in the length direction: 42 μm Evaluation 1

Models 1 to 7 of the electronic device were subjected to analysis in which calculations were performed to determine, using Femtet (registered trademark) manufactured by Murata Software Co., Ltd., the degree of stress that was exerted on the tip of the first underlying electrode on the first main surface of the body due to tensile stress caused by thermal contraction of solder. Table 1 shows results of the calculations.

Relative values of stress exerted on the tip of the first underlying electrode are shown in the "Stress" column in Table 1, with Model 1 of the electronic device taken as a base of 100. The "Rate of Stress Reduction" column in Table 1 gives an idea of how much the stress was reduced relative to the stress exerted on the tip of the first underlying electrode in Model 1 of the electronic device.

TABLE 1

| | Stress | Rate of Stress Reduction (%) |
|---|---|---|
| Model 1 | 100 | — |
| Model 2 | 3 | 97 |
| Model 3 | 13 | 87 |
| Model 4 | 2 | 98 |
| Model 5 | 2 | 98 |
| Model 6 | 10 | 90 |
| Model 7 | 2 | 98 |

Model $_1$ of the electronic device is a comparative example that does not fall within the scope of the present disclosure. Models 2 to 7 of the electronic device are examples that fall within the scope of the present disclosure.

As can be seen from Table 1, the amount of stress exerted on the tip of the first underlying electrode was smaller in Models 2 to 7 of the electronic device than in Model 1 of the electronic device. It can thus be expected that the first plating electrode in each of Models 2 to 7 will be less likely to come off; therefore, Models 2 to 7 each produce the effect of eliminating or reducing the possibility that the reliability of the coil component will be impaired.

Models 8 to 13

Models 8 to 13 of the electronic device are structurally similar to Model 4 of the electronic device except that the distance between the first underlying electrode and the second underlying electrode in the length direction is varied as shown in Table 2.

Evaluation 2

Models 8 to 13 of the electronic devices were subjected to analysis in which calculations were performed to determine, in much the same way as in Evaluation 1, the degree of stress that was exerted on the tip of the first underlying electrode on the first main surface of the body. Table 2 shows results of the calculations. The results of the calculations performed on Model 4 of the electronic device are shown in Table 2 as well as in Table 1.

The terms "stress" and "rate of stress reduction" in Table 2 are as defined in relation to Table 1. The distance between the first underlying electrode and the second underlying electrode in the length direction is shown in the "Distance between Underlying Electrodes" column in Table 2.

TABLE 2

| | Distance between Underlying Electrodes (μm) | stress | Rate of Stress Reduction (%) |
|---|---|---|---|
| Model 8 | 6 | 46 | 54 |
| Model 9 | 18 | 42 | 58 |
| Model 10 | 30 | 45 | 55 |
| Model 11 | 36 | 4 | 96 |
| Model 4 | 42 | 2 | 98 |
| Model 12 | 54 | 9 | 91 |
| Model 13 | 66 | 7 | 93 |

Models 8 to 13 of the electronic device as well as Model 4 of the electronic device are examples that fall within the scope of the present disclosure.

As can be seen from Table 2, the amount of stress exerted on the tip of the first underlying electrode was smaller in Models 8 to 13 of the electronic device as well as in Model 4 of the electronic device than in Model 1 of the electronic device. It can thus be expected that the first plating electrode in each of Models 8 to 13 will be less likely to come off; therefore, Models 8 to 13 each produce the effect of eliminating or reducing the possibility that the reliability of the coil component will be impaired. In Model 4 and Models 11 to 13, the distance between the first underlying electrode and the second underlying electrode in the length direction is greater than or equal to 36 μm and less than or equal to 66 μm (i.e., from 36 μm to 66 μm). The amount of stress exerted on the tip of the first underlying electrode was much smaller in Model 4 and Models 11 to 13 of the electronic device than in Models 8 to 10 of the electronic device. It can thus be expected that the first underlying electrode in each of Model 4 and Models 11 to 13 in particular will be much less likely to come off; therefore, Model 4 and Models 11 to 13 each produce a greater effect of eliminating or reducing the possibility that the reliability of the coil component will be impaired.

What is claimed is:

1. An electronic component, comprising:

a body having a first end surface, a second end surface, a first main surface, a second main surface, a first side surface, and a second side surface, the first and second end surfaces being located on opposite sides in a length direction, the first and second main surfaces being located on opposite sides in a height direction orthogonal to the length direction, and the first and second side surfaces being located on opposite sides in a width direction orthogonal to the length direction and orthogonal to the height direction;

an inner conductor inside the body; and an outer electrode on at least a portion of the first main surface of the body, wherein the outer electrode includes an underlying electrode and a plating electrode which covers the underlying electrode, the underlying electrode includes:

a first underlying electrode on a portion of the first main surface of the body and is connected directly to the inner conductor, wherein the first underlying electrode has a first portion on the first end surface of the body and a second portion on the first main surface of the body, and a second underlying electrode that has a portion at the first main surface of the body, and is spaced away from the second portion of the first underlying electrode and is closer than the first underlying electrode to a center of the body in the length direction and is not connected directly to the inner conductor, and the plating electrode includes:

a first plating electrode which covers the first underlying electrode, and a second plating electrode which covers the second underlying electrode.

2. The electronic component according to claim 1, wherein the second underlying electrode is on and over a portion of the first main surface of the body, and spaced away from the first underlying electrode and closer than the first underlying electrode to the center of the body in the length direction.

3. The electronic component according to claim 2, wherein the first plating electrode and the second plating electrode are in contact with each other.

4. The electronic component according to claim 2, wherein

The first plating electrode and the second plating electrode are spaced away from each other.

5. The electronic component according to claim 2, wherein the first underlying electrode on the portion of the first main surface of the body extends continuously over a portion of the first end surface of the body, the underlying electrode further includes a third underlying electrode that has a portion at the first end surface of the body, and is spaced away from the first underlying electrode, and is closer than the first underlying electrode to the second main surface of the body in the height direction and is not connected directly to the inner conductor, and the plating electrode further includes a third plating electrode which covers the third underlying electrode.

6. The electronic component according to claim 2, wherein the inner conductor includes a coil conductor.

7. An electronic device, comprising:

the electronic component according to claim 2;

a substrate a land electrode disposed on a surface of the substrate; and solder that electrically connects between the outer electrode of the electronic component and the land electrode on the substrate, wherein the solder continuously covers the first plating electrode and the second plating electrode.

8. The electronic component according to claim 1, wherein the first plating electrode and the second plating electrode are in contact with each other.

9. The electronic component according to claim 8, wherein the first underlying electrode on the portion of the first main surface of the body extends continuously over a portion of the first end surface of the body, the underlying electrode further includes a third underlying electrode that has a portion at the first end surface of the body, and is spaced away from the first underlying electrode, and is closer than the first underlying electrode to the second main surface of the body in the height direction and is not connected directly to the inner conductor, and the plating electrode further includes a third plating electrode which covers the third underlying electrode.

10. An electronic device, comprising:

the electronic component according to claim 3;

a substrate a land electrode disposed on a surface of the substrate; and solder that electrically connects between the outer electrode of the electronic component and the land electrode on the substrate, wherein the solder continuously covers the first plating electrode and the second plating electrode.

11. The electronic component according to claim 1, wherein the first plating electrode and the second plating electrode are spaced away from each other.

12. The electronic component according to claim 11, wherein a distance between the first plating electrode and the second plating electrode in the length direction is from 3 μm to 20 μm.

13. The electronic component according to claim 1, wherein the first underlying electrode on the portion of the first main surface of the body extends continuously over a portion of the first end surface of the body, the underlying electrode further includes a third underlying electrode that has a portion at the first end surface of the body, and is spaced away from the first underlying electrode, and is closer than the first underlying electrode to the second main surface of the body in the height direction and is not connected directly to the inner conductor, and the plating electrode further includes a third plating electrode which covers the third underlying electrode.

14. The electronic component according to claim 13, wherein the first plating electrode and the third plating electrode are in contact with each other.

15. The electronic component according to claim 13, wherein the first plating electrode and the third plating electrode are spaced away from each other.

16. The electronic component according to claim 15, wherein a distance between the first plating electrode and the third plating electrode in the height direction is from 3 μm to 20 μm.

17. The electronic component according to claim 1, wherein the inner conductor includes a coil conductor.

18. An electronic device, comprising:

the electronic component according to claim 1;

a substrate provided with a land electrode disposed on a surface of the substrate; and solder that electrically connects between the outer electrode of the electronic component and the land electrode on the substrate, wherein the solder continuously covers the first plating electrode and the second plating electrode.

19. The electronic device according to claim 18, wherein the first underlying electrode on the portion of the first main surface of the body extends continuously over a portion of the first end surface of the body, the underlying electrode further includes a third underlying electrode that has a portion at the first end surface of the body, and is spaced away from the first underlying electrode, and is closer than the first underlying electrode to the second main surface of the body in the height direction and is not connected directly to the inner conductor, the plating electrode further includes a third plating electrode which covers the third underlying electrode, and the solder continuously covers the first plating electrode and the third plating electrode.

20. An electronic component, comprising:

a body having a first end surface, a second end surface, a first main surface, a second main surface, a first side surface, and a second side surface, the first and second end surfaces being located on opposite sides in a length direction, the first and second main surfaces being located on opposite sides in a height direction orthogonal to the length direction, and the first and second side surfaces being located on opposite sides in a width direction orthogonal to the length direction and orthogonal to the height direction;

an inner conductor inside the body; and an outer electrode on at least a portion of the first main surface of the body, wherein the outer electrode includes an underlying electrode and a plating electrode which covers the underlying electrode, the underlying electrode includes:

a first underlying electrode on a portion of the first main surface of the body and is connected directly to the inner conductor, and a second underlying electrode that has a portion at the first main surface of the body, and is spaced away from the first underlying electrode and is closer than the first underlying electrode to a center of the body in the length direction and is not connected directly to the inner conductor, and the plating electrode includes:

a first plating electrode which covers the first underlying electrode, and a second plating electrode which covers the second underlying electrode, wherein the first plating electrode and the second plating electrode extend continuously from a region over the first underlying electrode to a region over the second underlying electrode.

* * * * *